US012632269B2

(12) United States Patent　　　　(10) Patent No.:　US 12,632,269 B2
Wang et al.　　　　　　　　　　　　(45) Date of Patent:　May 19, 2026

(54) FORWARD-STYLE GRADIENT GeMMs

(71) Applicant: SambaNova Systems, Inc., Palo Alto, CA (US)

(72) Inventors: Mingran Wang, San Jose, CA (US); Leon Zhang, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 391 days.

(21) Appl. No.: 18/202,625

(22) Filed: May 26, 2023

(65) Prior Publication Data

US 2023/0385077 A1　　Nov. 30, 2023

Related U.S. Application Data

(60) Provisional application No. 63/346,231, filed on May 26, 2022.

(51) Int. Cl.
| | |
|---|---|
| *G06F 9/45* | (2006.01) |
| *G06F 7/544* | (2006.01) |
| *G06F 8/41* | (2018.01) |
| *G06F 9/448* | (2018.01) |
| *G06F 17/16* | (2006.01) |

(52) U.S. Cl.
CPC .......... *G06F 9/4494* (2018.02); *G06F 7/5443* (2013.01); *G06F 8/4441* (2013.01); *G06F 17/16* (2013.01)

(58) Field of Classification Search
CPC .................................................... G06F 9/4494
USPC ....................................................... 717/151
See application file for complete search history.

(56) References Cited

U.S. PATENT DOCUMENTS

| | | | | |
|---|---|---|---|---|
| 12,380,060 | B2 * | 8/2025 | Du .......................... | G06F 15/825 |
| 2021/0248115 | A1 * | 8/2021 | Jones .................... | G06F 16/212 |

FOREIGN PATENT DOCUMENTS

WO　　2010142987 A1　12/2010

OTHER PUBLICATIONS

Koeplinger et al., Spatial: A Language and Compiler for Application Accelerators, PLDI '18, Jun. 18-22, 2018, Association for Computng Machinery, 16 pages.

(Continued)

*Primary Examiner* — Evral E Bodden
(74) *Attorney, Agent, or Firm* — FP; Sikander M. Khan

(57) ABSTRACT

A method for improving runtime performance and alleviating place and route issues in a reconfigurable computing system includes receiving a compute graph for execution on a reconfigurable dataflow processor. The compute graph includes a node specifying a template-based operation on a first and second tensor having a shared batch dimension B. The node may be split into B nodes. Each of the template-based operations on the pair of tensors may be replace with a GeMM operation on the first reduced rank tensor slice and a tile. B nodes that specify the GeMM operation may be appended with at least one first addition node that accepts input from the B nodes to produce a first modified compute graph. The first modified compute graph may be executed. The method describes a significant improvement to overall compute utilization across gradient-sections. Spatial tiling of tensors facilitates gradient calculation without the use of accumulators.

19 Claims, 15 Drawing Sheets

(56)           References Cited

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al., A Survey on Coarse-Grained Reconfigurable Architectures From a Performance Perspective, IEEEAccess, vol. 2020.3012084, Jul. 27, 2020, 25 pages.

Prabhakar et al., Plasticine: A Reconfigurable Architecture for Parallel Patterns, ISCA, Jun. 24-28, 2017, 14 pages.

Zhang et al., "SARA: Scaling a Reconfigurable Dataflow Accelerator," 2021 ACM/IEEE 48th Annual International Symposium on Computer Architecture (ISCA), 2021, pp. 1041-1054.

* cited by examiner

500

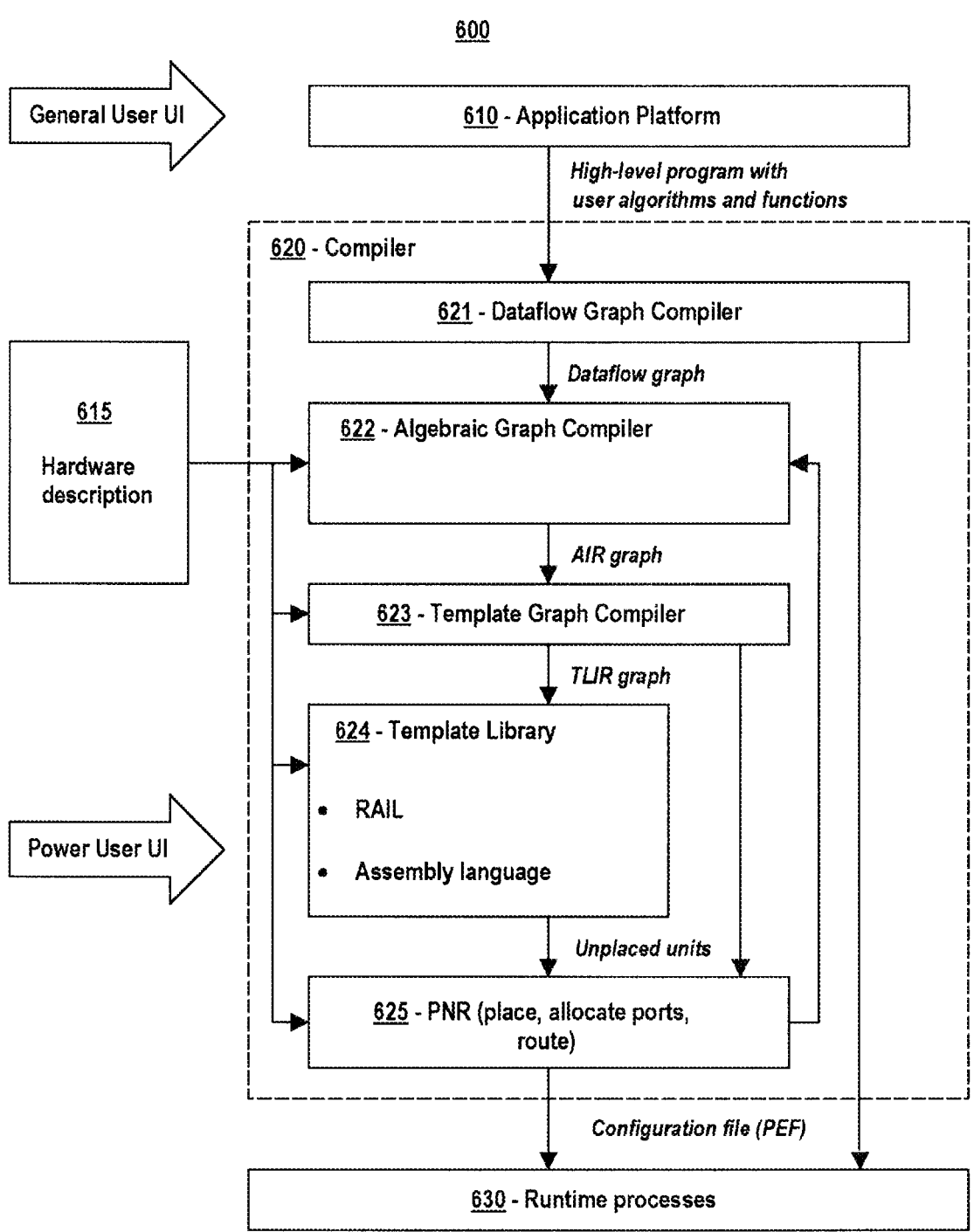

600

General User UI

610 - Application Platform

*High-level program with user algorithms and functions*

620 - Compiler

621 - Dataflow Graph Compiler

*Dataflow graph*

615

Hardware description

622 - Algebraic Graph Compiler

*AIR graph*

623 - Template Graph Compiler

*TLIR graph*

624 - Template Library

• RAIL

• Assembly language

Power User UI

*Unplaced units*

625 - PNR (place, allocate ports, route)

*Configuration file (PEF)*

630 - Runtime processes

FIG. 6

User Program Statements — 710,712

```
Linear = torch.nn.linear(K,N)
Relu =   torch.nn.relu
Softmax = torch.nn.Softmax(dim=3)
X1 = torch.randn(N, C, M, K)
X2 = X1.to("RDP")
X3 = Linear(X2)
X4 = Relu(X3)
X5 = Softmax(X4)
X6 = X5.to("CPU")
```

User Program Compute Graph — 715

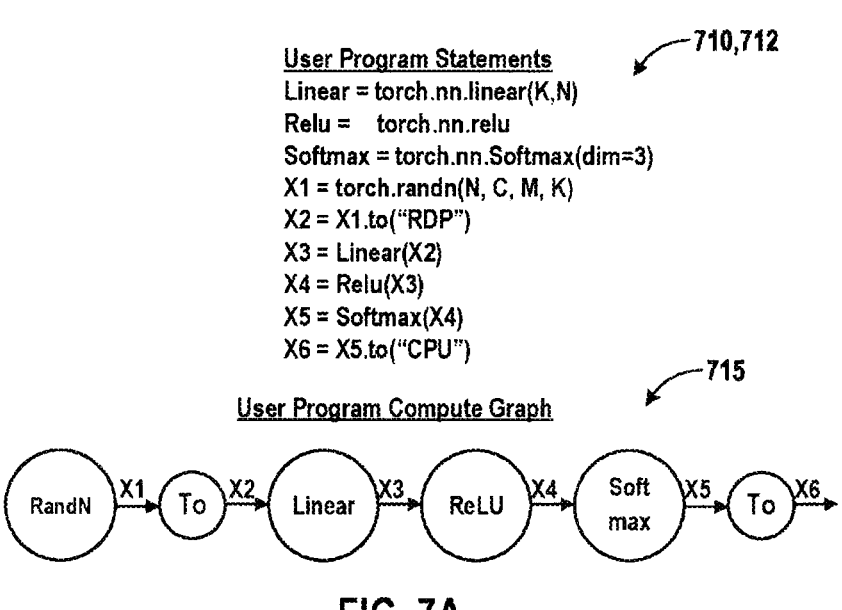

FIG. 7A

Air/Tensor Statements — 720

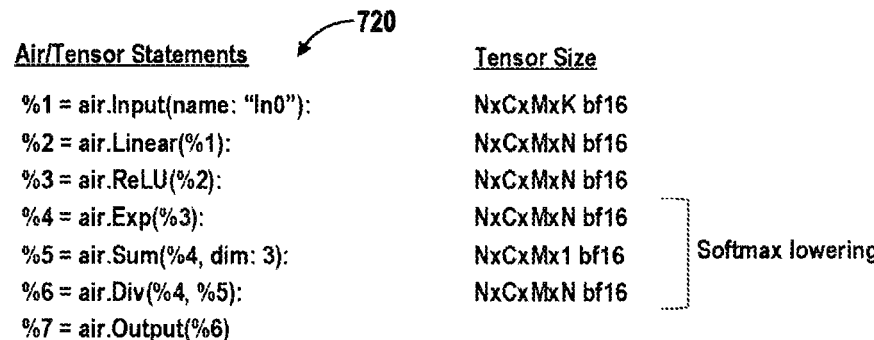

| Air/Tensor Statements | Tensor Size | |
|---|---|---|
| %1 = air.Input(name: "In0"): | NxCxMxK bf16 | |
| %2 = air.Linear(%1): | NxCxMxN bf16 | |
| %3 = air.ReLU(%2): | NxCxMxN bf16 | |
| %4 = air.Exp(%3): | NxCxMxN bf16 | ⎫ |
| %5 = air.Sum(%4, dim: 3): | NxCxMx1 bf16 | ⎬ Softmax lowering |
| %6 = air.Div(%4, %5): | NxCxMxN bf16 | ⎭ |
| %7 = air.Output(%6) | | |

Air/Tensor Compute Graph — 725

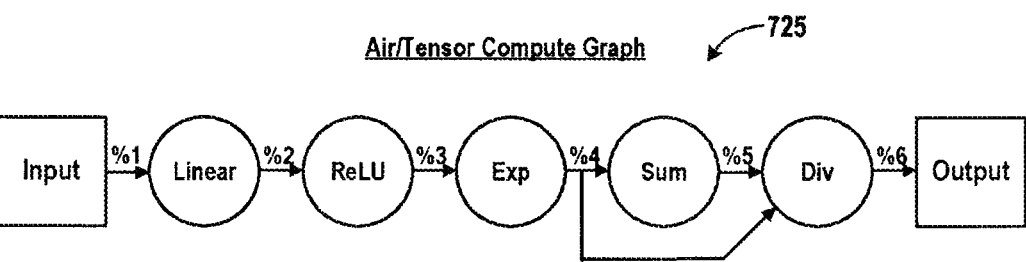

Template Dataflow Statements                     Tensor Size
%1 = tlir.Region(name: "In0"):                   NxCxMxK bf16
%2 = tlir.Region(name: "Weight"):                KxN bf16
%3 = tlir.Region(name: "Bias"):                  1xN bf16
%4 = tlir.Region(name: "Out0"):                  NxCxMxN bf16
%5 = tlir.Load(%2)
%6 = tlir.Load(%3)      ⟋732
%7 = tlir.MetaPipeline(iters: N) {
    %8 = tlir.Load(%1, dim: 1):                  CxMxK bf16
    %9 = tlir.Buffer(%5, depth: 2) ⟋732          CxMxK bf16
    %10 = tlir.MetaPipeline(iters: C) {
        %11 = tlir.ReadSlice(%9, dim: 1):   MxK bf16
        %12 = tlir.Linear(%5, %11):         MxN bf16
        %13 = tlir.Buffer(%12, depth: 2):   MxN bf16
        %14 = tlir.AddBias(%13, %6):        MxN bf16
        %15 = air.ReLU(%14):                MxN bf16
        %16 = air.Exp(%15):                 MxN bf16
        %17 = tlir.Buffer(%16, depth: 2):   MxN bf16
        %18 = tlir.Sum(%17, dim: 1):        Mx1 bf16
        %19 = tlir.Div(%17, %18):           MxN bf16
        %20 = tlir.Store(%4, %19)
    }
}

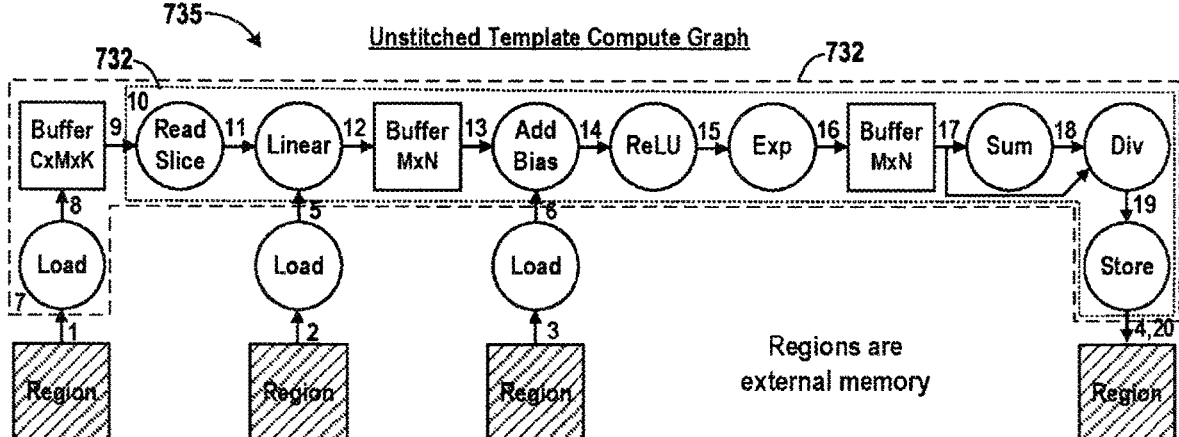

735 →    Unstitched Template Compute Graph

Regions are external memory

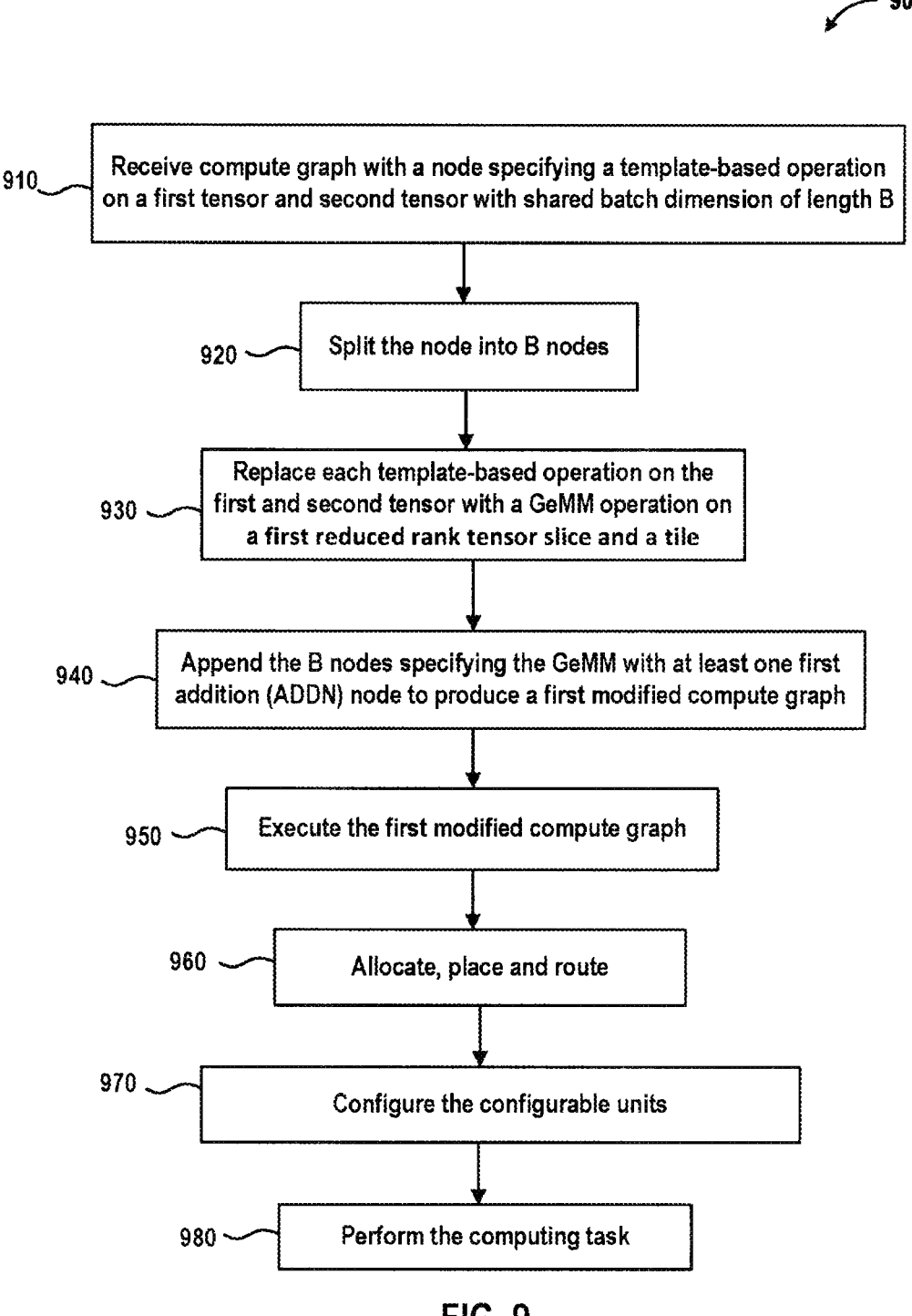

910 — Receive compute graph with a node specifying a template-based operation on a first tensor and second tensor with shared batch dimension of length B 920 — Split the node into B nodes 930 — Replace each template-based operation on the first and second tensor with a GeMM operation on a first reduced rank tensor slice and a tile 940 — Append the B nodes specifying the GeMM with at least one first addition (ADDN) node to produce a first modified compute graph 950 — Execute the first modified compute graph 960 — Allocate, place and route 970 — Configure the configurable units 980 — Perform the computing task

FIG. 9

FORWARD-STYLE GRADIENT GeMMs

RELATED APPLICATIONS AND DOCUMENTS

This application claims the benefit of (priority to) U.S. Provisional Application 63/346,231 filed on May 26, 2022, entitled "Forward-style Gradient Gemms".

This application is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

Zhang et al., "SARA: Scaling a Reconfigurable Dataflow Accelerator," 2021 ACM/IEEE 48th Annual International Symposium on Computer Architecture (ISCA), 2021, pp. 1041-1054;

U.S. nonprovisional patent application Ser. No. 16/260, 548, filed Jan. 29, 2019, entitled "MATRIX NORMAL/ TRANSPOSE READ AND A RECONFIGURABLE DATA PROCESSOR INCLUDING SAME,";

U.S. nonprovisional patent application Ser. No. 15/930, 381, filed May 12, 2020, entitled "COMPUTATIONALLY EFFICIENT GENERAL MATRIX-MATRIX MULTIPLICATION (GEMM),";

U.S. nonprovisional patent application Ser. No. 16/890, 841, filed Jun. 2, 2020, entitled "ANTI-CONGESTION FLOW CONTROL FOR RECONFIGURABLE PROCESSORS,";

U.S. nonprovisional patent application Ser. No. 17/023, 015, filed Sep. 16, 2020, entitled "COMPILE TIME LOGIC FOR DETECTING STREAMING COMPATIBLE AND BROADCAST COMPATIBLE DATA ACCESS PATTERNS,";

U.S. nonprovisional patent application Ser. No. 17/031, 679, filed Sep. 24, 2020, entitled "SYSTEMS AND METHODS FOR MEMORY LAYOUT DETERMINATION AND CONFLICT RESOLUTION,";

U.S. nonprovisional patent application Ser. No. 17/216, 647, filed Mar. 29, 2021, entitled "TENSOR PARTITIONING AND PARTITION ACCESS ORDER,";

U.S. Provisional Patent Application No. 63/190,749, filed May 19, 2021, entitled "FLOATING POINT MULTIPLY-ADD, ACCUMULATE UNIT WITH CARRY-SAVE ACCUMULATOR,";

U.S. Provisional Patent Application No. 63/174,460, filed Apr. 13, 2021, entitled "EXCEPTION PROCESSING IN CARRY-SAVE ACCUMULATION UNIT FOR MACHINE LEARNING,";

U.S. nonprovisional patent application Ser. No. 17/397, 241, filed Aug. 9, 2021, entitled "FLOATING POINT MULTIPLY-ADD, ACCUMULATE UNIT WITH CARRY-SAVE ACCUMULATOR,";

U.S. nonprovisional patent application Ser. No. 17/520, 290, filed Nov. 5, 2021, entitled "SPARSE MATRIX MULTIPLIER IN HARDWARE AND A RECONFIGURABLE DATA PROCESSOR INCLUDING SAME,";

All of the related application(s) and documents listed above are hereby incorporated by reference herein for all purposes.

BACKGROUND

The present subject matter relates to optimizing computing tasks for course-grained reconfigurable (CGR) processors.

Reconfigurable processors can be configured to implement a variety of functions more efficiently or faster than might be achieved using a general-purpose processor executing a computer program. For example, coarse-grain reconfigurable architectures (e.g. CGRAs) are being developed in which the configurable units in the array are more complex than used in typical, more fine-grained FPGAs, and may enable faster or more efficient (e.g., dataflow) execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Despite the promise of CGRAs, optimizing the compute graphs for the configurable units of a CRGA remains a challenge.

SUMMARY OF THE INVENTION

A method for improving runtime performance and alleviating place and route issues in a reconfigurable computing system that includes receiving a compute graph for execution on a reconfigurable dataflow processor and that includes a grid of compute units and a grid of memory units connected with a switching array. The compute graph includes a node specifying a template-based (gradient) operation on a first and second tensor with a shared batch dimension of length B. The tensor may be sliced on the batch dimension, reshaped, and/or tiled. The node is split into B nodes. Each of the template-based operations on the first and second tensors is replaced with a general matrix multiplication (GeMM) operation on the first reduced rank tensor slice and a tile. In addition, the B nodes are appended with at least one first addition (ADDN) node that accepts input from the B nodes and forms a first modified compute graph.

In some embodiments, a smaller group of the B nodes may form a section. Sections may be processed sequentially to calculate the gradient, which enables another level of flexibility and resource optimization. The B (or section) nodes may be parallel to one another, so that each tensor slice and tile may be processed in parallel and fed into the at least one first ADDN node. The method described herein may use spatial tiling to improve utilization of compute resources. Further, the method may be particularly useful for calculating gradients in applications such as generative pre-training (GPT). A corresponding system and computer program product are also disclosed herein.

BRIEF DESCRIPTION OF THE DRAWINGS

FIG. 6 is a block diagram of a compiler stack implementation suitable for generating a configuration file for a CGR processor.

FIGS. 7A-7E illustrate various representations of an example user program corresponding to various stages of a compiler stack such as the compiler stack of FIG. 6.

FIG. 9 is a flowchart of one example of a graph spatial split for gradient calculation method for a CGR dataflow computing system.

DETAILED DESCRIPTION

Figure 1:
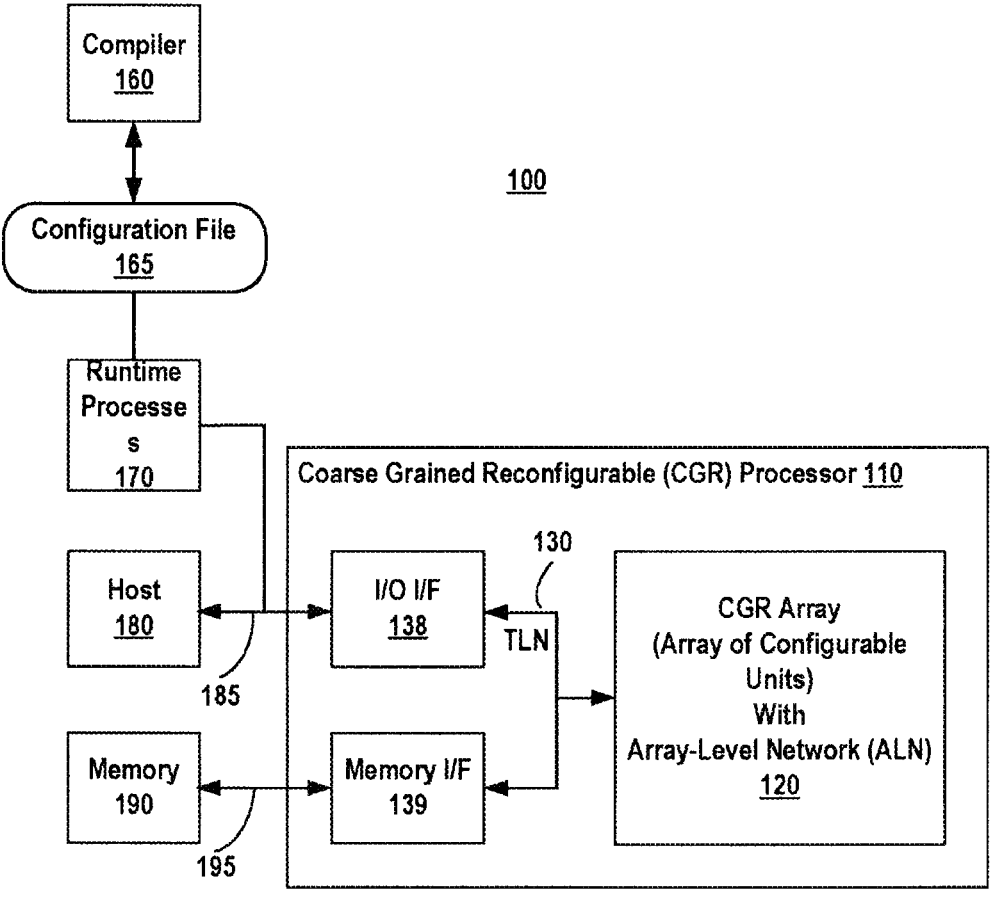
FIG. 1 illustrates an example system including a coarse-grained reconfigurable (CGR) processor, a host, and a memory.

The following detailed description is made with reference to the figures. Example implementations are described to illustrate the technology disclosed, not to limit its scope, which is defined by the claims. Those of ordinary skill in the art will recognize a variety of equivalent variations on the description that follows.

FIGS. 1-7E depict at least one example of an environment wherein the disclosed technology may be deployed while FIGS. 8-14 depict details on various examples of the disclosed technology.

Traditional compilers translate human-readable computer source code into machine code that can be executed on a Von Neumann computer architecture. In this architecture, a processor serially executes instructions in one or more threads of software code. The architecture is static, and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable (CGR) architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The following terms or acronyms used herein are defined at least in part as follows:

AGCU—address generator (AG) and coalescing unit (CU).

AI—artificial intelligence.

AIR—arithmetic or algebraic intermediate representation.

ALN—array-level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Individual stages may create or update an intermediate representation (IR) of the translated statements. Compiler stages are illustrated with reference to FIG. 6.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Data Flow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

Logical CGR array or logical CGR unit—a CGR array or a CGR unit that is physically realizable, but that may not have been assigned to a physical CGR array or to a physical CGR unit on an IC.

Meta-pipeline—see pipeline.

ML—machine learning.

PCU—pattern compute unit—a compute unit that can be configured to repetitively perform a sequence of operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level (typically a sequence of logical operations that are to be repetitively executed) that enables correct timing and loop control of node-level operations of the configured graph. Gate-level pipelines are usually hard wired and unchangeable, whereas meta-pipelines are configured at the CGR processor, CGR array level, and/or GCR unit level.

Pipeline Stages—a pipeline is divided into stages that are coupled with one another to form a pipe topology.

PMU—pattern memory unit—a memory unit that can store data according to a programmed pattern.

PNR—place and route—the assignment of logical CGR units and associated processing/operations to physical CGR units in an array, and the configuration of communication paths between the physical CGR units.

RAIL—reconfigurable dataflow processor (RDP) abstract intermediate language.

CGR Array—an array of CGR units, coupled with each other through an array-level network (ALN), and coupled with external elements via a top-level network (TLN). A CGR array can physically implement the nodes and edges of a dataflow graph.

SIMD—single-instruction multiple-data—an arithmetic logic unit (ALU) that simultaneously performs a single programmable operation on multiple data elements delivering multiple output results.

TLIR—template library intermediate representation.

TLN—top-level network.

Implementations

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. See, for example, FIGS. 6 and 7A-7E. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

FIG. 1 illustrates an example coarse-grained reconfigurable architecture (CGRA) system 100 including a coarse-grained reconfigurable (CGR) processor 110 a compiler 160, runtime processes 170, a host 180, and a memory 190. CGR processor 110 includes a CGR array such as a CGR array 120. CGR array 120 includes an array of configurable units in an array level network. CGR processor 110 further includes an IO interface 138, and a memory interface 139. CGR array 120 is coupled with IO interface 138 and memory interface 139 through a data bus 130 which may be part of a top-level network (TLN). Host 180 communicates with IO interface 138 using a system data bus 185, and memory interface 139 communicates with memory 190 using a memory bus 195. A configurable unit in the CGR array 120 may comprise a compute unit or a memory unit. A configurable unit in the CGR array 120 may also comprise a pattern memory unit (PMU), a pattern compute unit (PCU), or a fused-compute memory unit (FCMU). Further examples include a coalescing unit (CU) and an address generator (AG), which may be combined in an AGCU. A configurable unit may also be reconfigurable.

The configurable units in the CGR array 120 may be connected with an array-level network (ALN) to provide the circuitry for execution of a computation graph or a dataflow graph that may have been derived from a high-level program with user algorithms and functions. The high-level program may include a set of procedures, such as learning or inferencing in an artificial intelligence (AI) or machine learning (ML) system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple CGR processors 110. In some implementations, CGR processor 110 may include one or more ICs. In other implementations, a single IC may span multiple CGR processors 110. In further implementations, CGR processor 110 may include multiple arrays of configurable units 120.

Host 180 may be, or include, a computer such as further described with reference to FIG. 2. Host 180 runs runtime processes 170, as further referenced herein, and may also be used to run computer programs, such as compiler 160 further described herein with reference to FIG. 9. In some implementations, compiler 160 may run on a computer that is similar to the computer described with reference to FIG. 2 but separate from host 180.

CGR processor 110 may accomplish computational tasks by executing a configuration file 165. Configuration file 165 may comprise a processor-executable format file suitable for configuring a CGR array 120 of a CGR processor 110. For the purposes of this description, a configuration file corresponds to a dataflow graph, or a translation of a dataflow graph, and may further include initialization data. Compiler 160 compiles the high-level program to provide the configuration file 165. In some implementations described herein, a CGR array 120 is configured by programming one or more configuration stores with all or parts of the configuration file 165. A single configuration store may be at the level of the CGR processor 110 or the CGR array 120, or a configurable unit may include an individual configuration store. The configuration file 165 may include configuration data for the CGR array 120 and the configurable units in the CGR array 120, and link the computation graph to the CGR array 120. Execution of the configuration file 165 by CGR processor 110 causes the array(s) of configurable units 120(s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
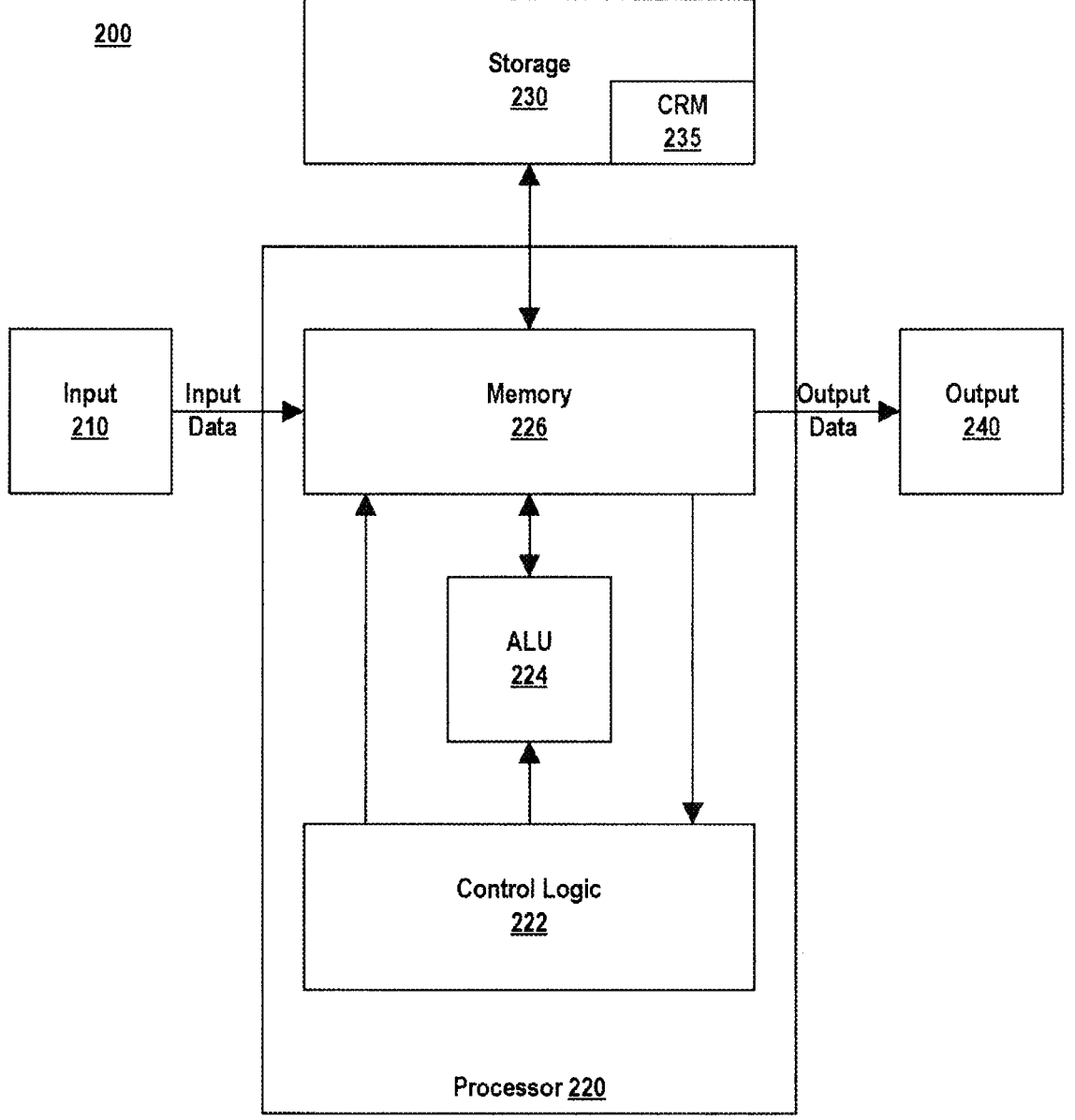
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
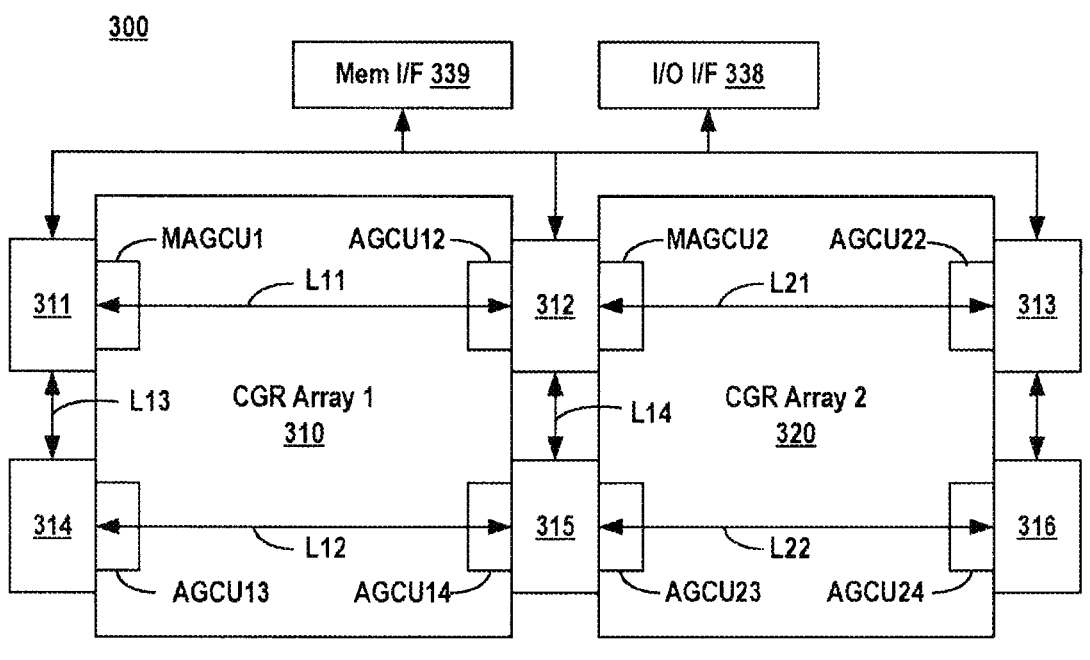
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
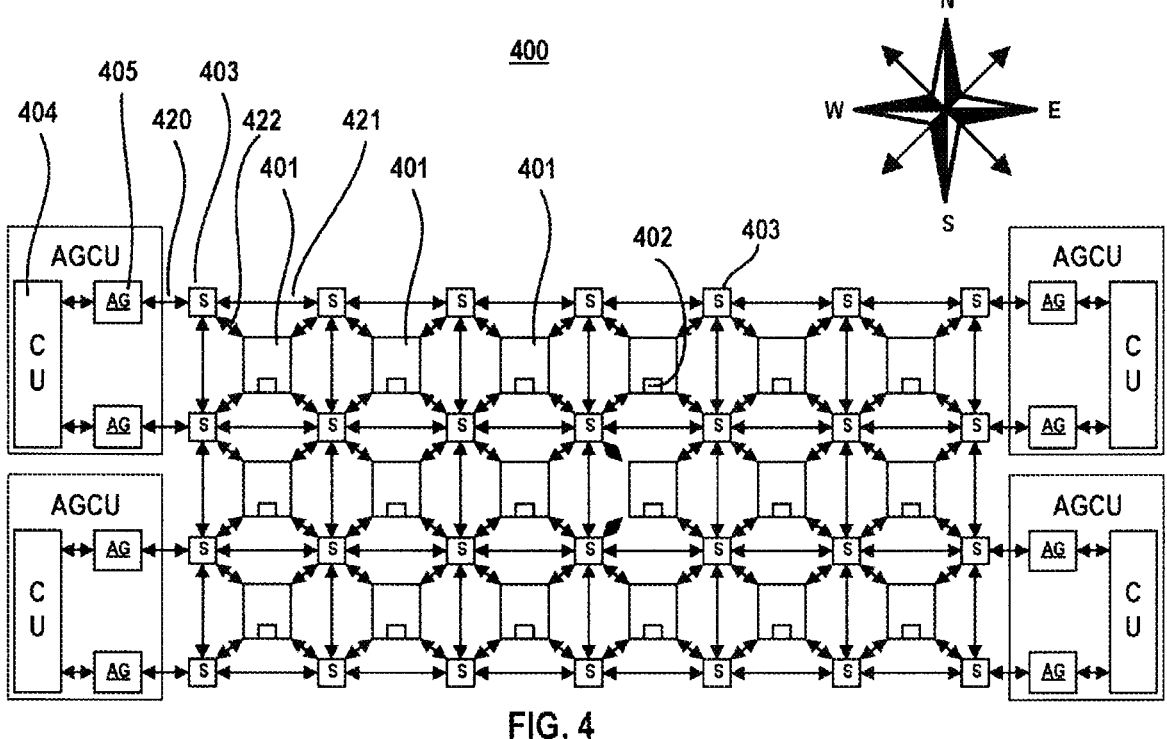
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed by individual stages, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of individual CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of individual packets and other information such as sequence numbers that can be used to reassemble a file when the packets are received out of order. Individual packet headers can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Individual ports may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Individual interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
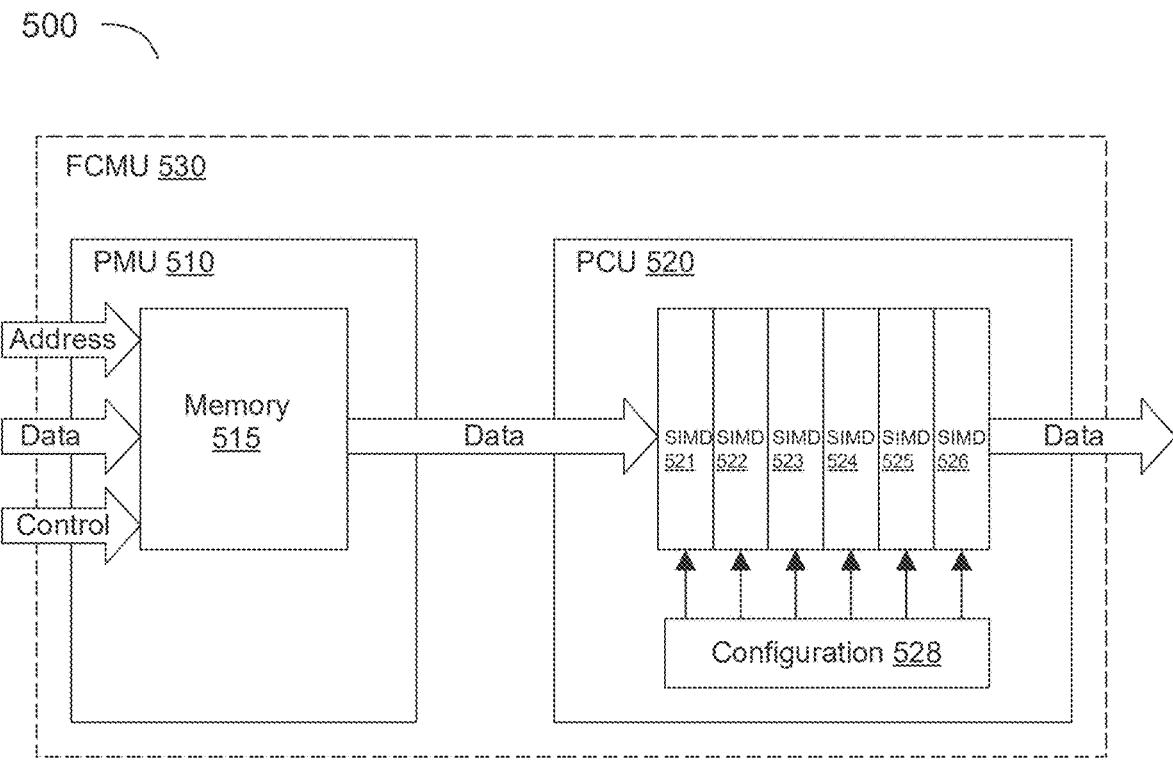
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Individual stages in PCU 520 may also hold one or more registers (not drawn) for short-term storage of parameters. Short-term storage, for example during one to several clock cycles or unit delays, allows for synchronization of data in the PCU pipeline.

Referring now to FIG. 6 which is a block diagram of a compiler stack 600 implementation suitable for generating a configuration file for a CGR processor. Referring also to FIGS. 7A-7E which illustrate various representations of an example user program 710 corresponding to various stages of a compiler stack such as the compiler stack 600. As depicted, compiler stack 600 includes several stages to convert a high-level program (e.g., user program 710) with statements 712 that define user algorithms and functions, e.g., algebraic expressions and functions, to configuration data for the CGR units.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms. The example user program 710 depicted in FIG. 7A comprises statements 712 that invoke various PyTorch functions.

Application platform 610 outputs a high-level program to compiler 620, which in turn outputs a configuration file to the reconfigurable data processor or CGRA processor where it is executed in runtime processes 630. Compiler 620 may include dataflow graph compiler 621, which may handle a dataflow graph, algebraic graph compiler 622, template graph compiler 623, template library 624, and placer and router (PNR) 625. In some implementations, template library 624 includes RDP abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program.

Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

Algebraic graph compiler 622 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 622 may also transform the graphs via autodiff and GradNorm, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Algebraic graph compiler 622 may further include an arithmetic or algebraic intermediate representation (AIR) stage that translates high-level graph and mapping decisions provided by the MAC level into explicit AIR/Tensor statements 720 and one or more corresponding algebraic graphs 725 as shown in FIG. 7B. In the depicted example, the algebraic graph compiler replaces the Softmax function specified in the user program 710 by its constituent statements/nodes (i.e., exp, sum and div). Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Template graph compiler 623 may translate AIR statements and/or graphs into TLIR statements 730 and/or graph(s) 735 (see FIG. 7C), optimizing for the target hardware architecture, into unplaced variable-sized units (referred to as logical CGR units) suitable for PNR 625. Meta-pipelines 732 that enable iteration control may be allocated for sections of the TLIR statements and/or corresponding sections of the graph(s) 735. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 7D:
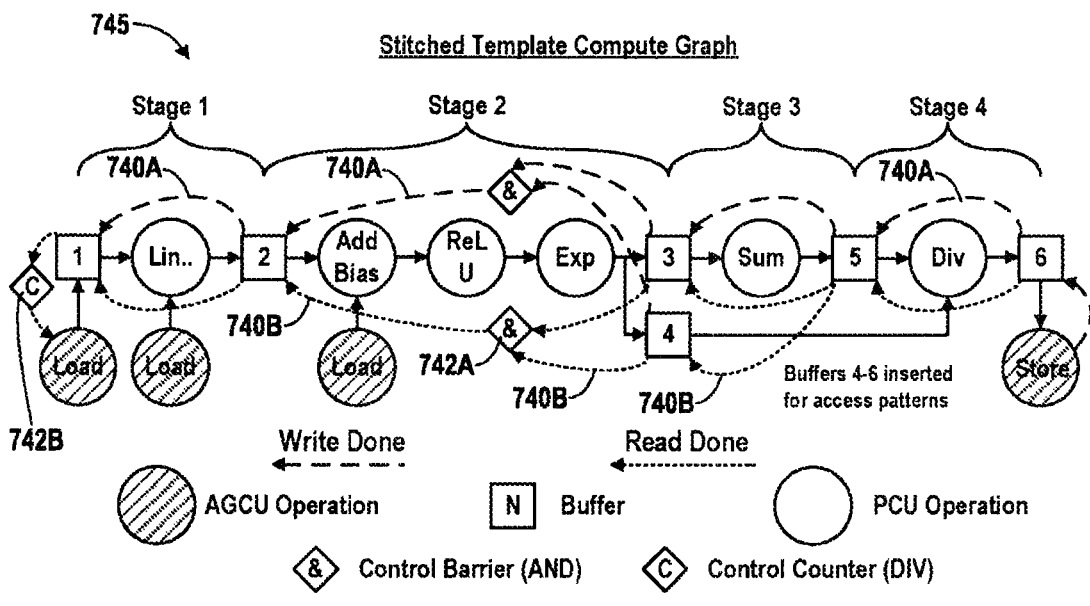
Figure 7E:
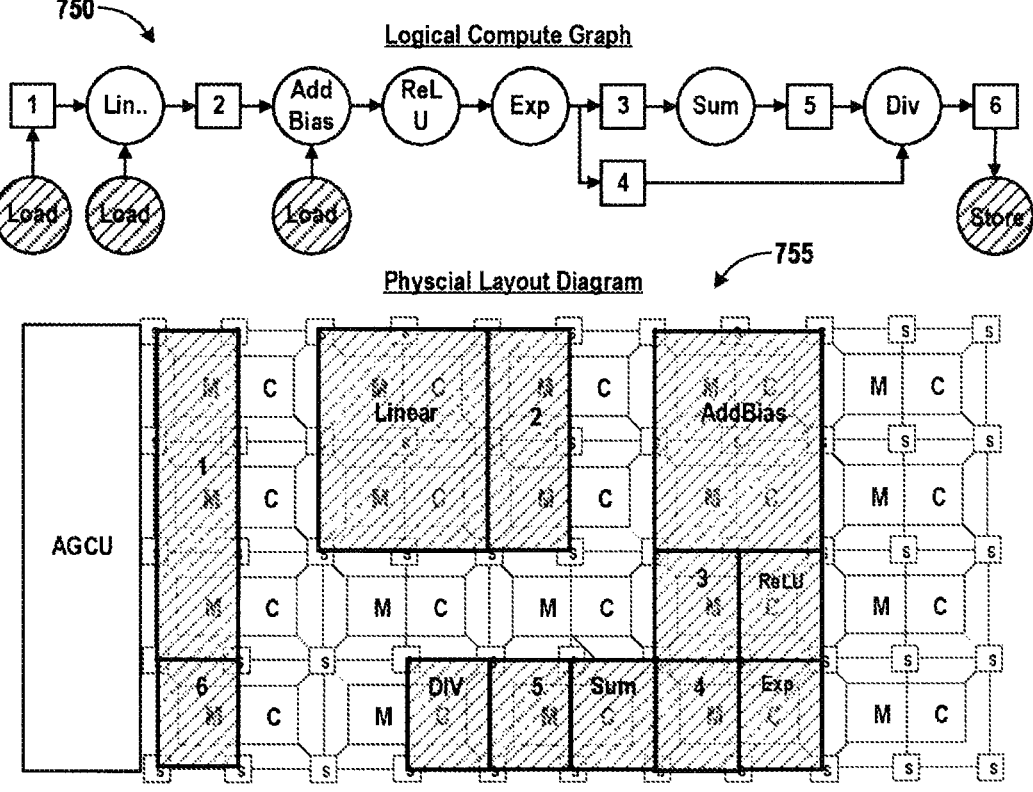

Referring to FIG. 7D, the template graph compiler may also determine the control signals 740 and control gates 742 required to enable the CGR units (whether logical or physical) to coordinate dataflow between the CGR units on the communication fabric of a CGR processor. This process, sometimes referred to as stitching, produces a stitched template compute graph 745 with control signals 740 and control gates 742. In the example depicted in FIG. 7D, the control signals 740 include write done signals 740A and read done signals 740B and the control gates 742 include 'AND' gates 742A and a counting or 'DIV' gate 742B. The control signals 740 and control gates 742 enable coordinated dataflow between the configurable units of CGR processors such as compute units, memory units, and AGCUs.

PNR 625 translates and maps logical (i.e., unplaced physically realizable) CGR units (e.g., the nodes of the logical compute graph 750 shown in FIG. 7E) to a physical layout (e.g., the physical layout 755 shown in FIG. 7E) on the physical chip level e.g., a physical array of CGR units. PNR 625 also determines physical data channels to enable communication among the CGR units and between the CGR units and circuits coupled via the TLN, allocates ports on the CGR units and switches, provides configuration data and initialization data for the target hardware, and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or placeholders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

Figure 8:
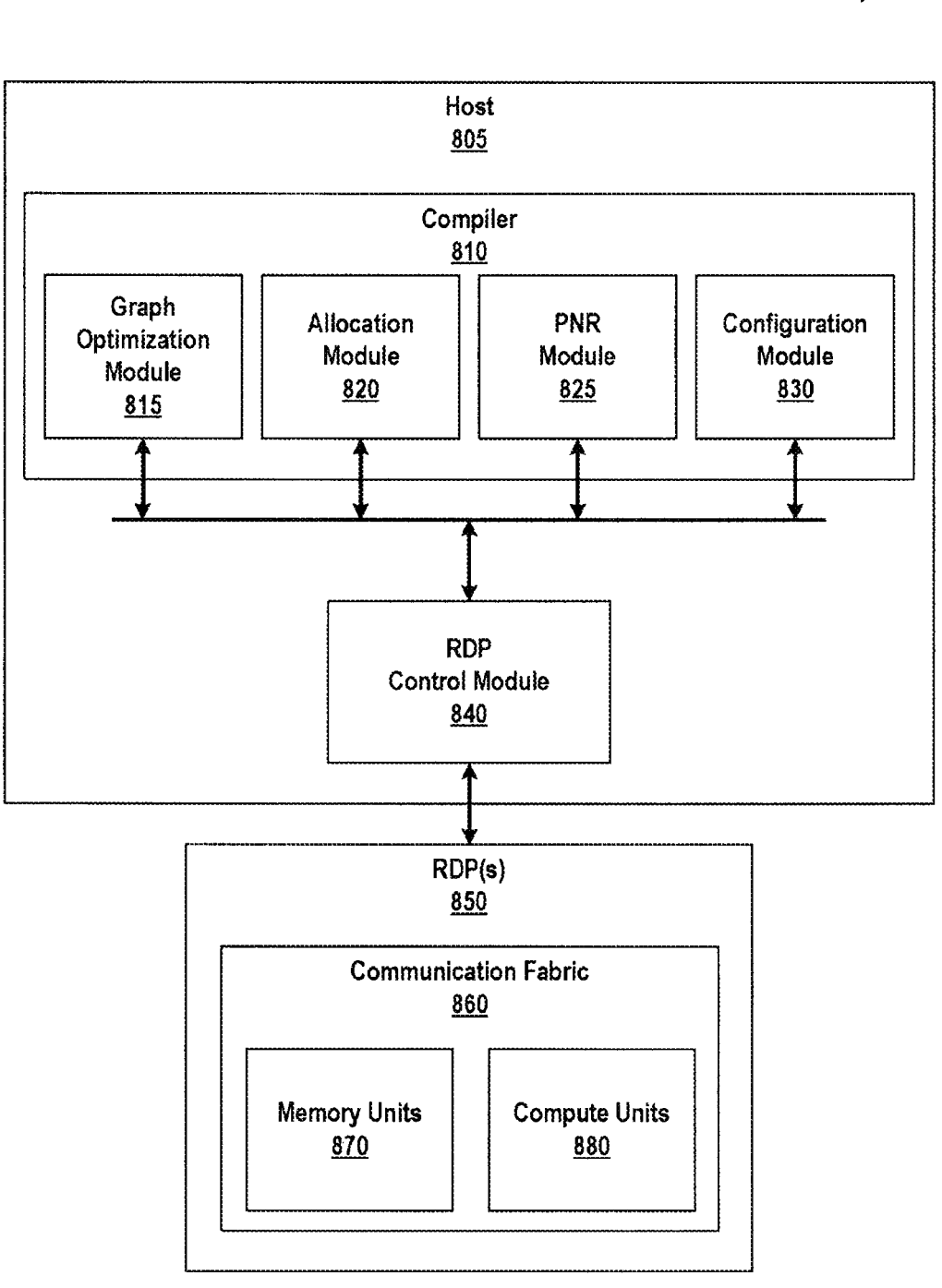
FIG. 8 is a block diagram illustrating one example of a CGR dataflow computing system.

FIG. 8 is a block diagram illustrating one example of a CGR dataflow computing system 800. As depicted, the CGR dataflow computing system 800 includes a graph optimization module 815, an allocation module 820, a place and route module 825, a configuration module 830, a reconfigurable dataflow processor (RDP) control module 840, and one or more RDPs 850 comprising a communication fabric 860, memory units 870 and compute units 880. The CGR dataflow computing system 800 enables evaluation and selection of template configurations as well as placement, routing, configuration, and deployment of those configured templates on the configurable units of the reconfigurable dataflow processors (RDPs) 850.

The depicted modules 815-840 may reside within, or be available to (e.g., within a library), a compiler 810 that executes on a host 805 and compiles computing tasks for execution on the RDPs 850. The computing task may be represented with a compute graph and/or code statements that indicate the mathematical operations that are to be executed. The graph optimization module 815 may analyze the nodes and input tensors of a compute graph of a computing task and make changes to input tensor shape as well as to those nodes to improve performance, optimize resource utilization, and/or alleviate place and route issues while maintaining the intended results of the computing task.

The allocation module 820 may allocate virtual compute units and memory units to the computing task or a portion thereof and may determine the number of compute units and the number of memory units required to support an operation. The allocation module 820 may function in conjunction with a partitioner (not shown) that partitions the compute graph into executable sub-graphs and inserts virtual memory units (i.e., buffers) into the compute graph that enable dataflow execution of the sub-graphs on reconfigurable dataflow processors such as the RDPs 850.

The place and route module 825 may generate multiple placement graph options corresponding to the computing task and select the placement graph that best meets the objectives and resources of the RDPs 850. For example, in some situations throughput may be the primary objective while in other situations, minimizing consumed resources may be the primary objective. The placement graphs may specify physical compute units, memory units and switch units that correspond to the virtual units of the executable sub-graph. To reduce communication distance and latency, the specified physical compute units, memory units, and switch units may be neighbors in a computing grid on an RDP 850.

The configuration module 830 may generate configuration information for the configuration units specified in the selected placement graphs. The RDP control module 840 may communicate the configuration information to the RDPs 850 and initiate dataflow in the computing grid. The communication fabric 860 may comprise switch units (not shown) that enable communication between the RDP control module 840 and memory units 870 and compute units 880 within the RDP(s) 850. One of skill in the art will appreciate that the placement graphs specified for execution may be relocated at runtime to a currently available RDP and/or a currently available region with a computing grid (e.g., tile region) of an RDP. The relocation may preserve the relative positions and connectivity of the configurable units specified by the placement graphs and enable concurrent execution of multiple placement graphs.

FIG. 9 is a flowchart of one example of a graph optimization method 900 for a CGR dataflow computing system. As depicted, the graph optimization method 900 includes receiving (910) a compute graph comprising a node specifying a template-based operation on a on a first tensor and second tensor with shared batch dimension of length B, splitting (920) the node into B nodes, replacing (930) each template-based operation on the first and second tensor with a GeMM operation on a first reduced rank tensor slice and a tile, appending (940) the B nodes specifying the GeMM with at least one first addition (ADDN) node to produce a first modified compute graph, executing (950) the first modified compute graph, allocating, placing, and routing (960) configurable units, configuring (970) the configurable units, and performing (980) the computing task. The graph optimization method 900 enables improved compute utilization, alleviates place and route issues, and contributes to overall performance improvement in a CGR dataflow computing system.

Receiving (910) a compute graph may include receiving a compute graph for execution on a reconfigurable dataflow processor (RDP). The RDP may comprise a grid of compute units and a grid of memory units interconnected with a switching array. The compute graph may comprise a node specifying a template-based operation that performs an operation on a first tensor and second tensor having a shared batch dimension of length B. The template-based (gradient) operation may include temporal tiling that uses loop meta-pipelines to process tensors.

Splitting (920) the node may include splitting the node into B nodes that each specify the template-based operation on the first and second tensors. The node may be spatially split into B parallel nodes. Splitting the node into B parallel nodes may allow the first and the second tensor inputs to be sliced (i.e., split) along the batch dimension, B. The first and second tensor slices may be reshaped to form a first reduced rank tensor slice and a second reduced rank tensor slice. Further, the second reduced rank tensor slice may be tiled to produce a tile set. One having skill in the art can appreciate that spatially splitting the node into B parallel nodes may support improved runtime performance and resource utilization.

Replacing (930) each of the template-based operations (on the first and second tensors) may include swapping each template-based operation with a GeMM operation (on the first reduced rank tensor slice and a tile). B nodes that specify the GeMM operation may be produced. Template-based operations may process the first and second tensors via temporal tiling. In contrast, the B nodes that specify the GeMM operation may spatially process input across B parallel nodes. In addition, each node may receive input from the first reduced rank tensor slice and the tile. Tiles from a tile set (within the same dimension) may each be processed sequentially by a GeMM operation node. GeMM operations on a slice and tile may reduce overhead and decrease large memory footprints.

Appending (940) the B nodes specifying the GeMM operation with at least one first ADDN node (to produce a first modified compute graph) may support the calculation of a gradient. The at least one first ADDN node may receive input from one or more B nodes specifying the GeMM operation on the first reduced rank tensor slice and a tile. One or more B nodes (usually a small number of the total B nodes) may form a section. GeMM operation results from the B nodes (or section) may be summed in the at least one first ADDN node to generate a first sum for calculating the intermediate sums and the final gradient. The first modified compute graph may enable calculation of a gradient but without on-chip storage of GeMM results for access by the accumulator (ACCM) template-based operation. One with skill in the art will appreciate that the first modified compute graph may have reduced overhead storage, reduced bulk data transfer, increased utilization of compute resources by minimizing gridlock, and increased performance.

Executing (950) the first modified compute graph on the RDP may include tensor flow through a collection of nodes connected by edges. Each meta-pipeline stage may comprise B parallel nodes (from splitting the node) that are executable via tensor flow through one or more compute units of the grid of compute units. Each meta-pipeline stage may receive or provide the first tensor and second tensor via at least one memory unit from the grid of memory units. Tensor flow through each meta-pipeline stage may be controlled by the least one memory unit from the grid of memory units. For example, the at least one memory unit that corresponds to a final stage within a meta-pipeline may provide a control signal that controls tensor flow through the meta-pipeline. Other stage memory units within the meta-pipeline may provide and/or receive data in response to the control signal.

Allocating, placing and routing (960) configurable units may include placing memory units and compute units and routing connections that enable dataflow between the memory units and compute units.

Configuring (970) the configurable units may include configuring the reconfigurable units of the reconfigurable computing grid. In conjunction therewith, configuring (970) the configurable units may include determining the configuration information for configurable units of the reconfigurable computing grid and communicating the configuration information to one or more RDPs 850 (e.g., via the RDP control module 840). Performing (980) the computing task may include initiating dataflow within the reconfigurable computing grid via the RDP control module 840.

Figure 10:
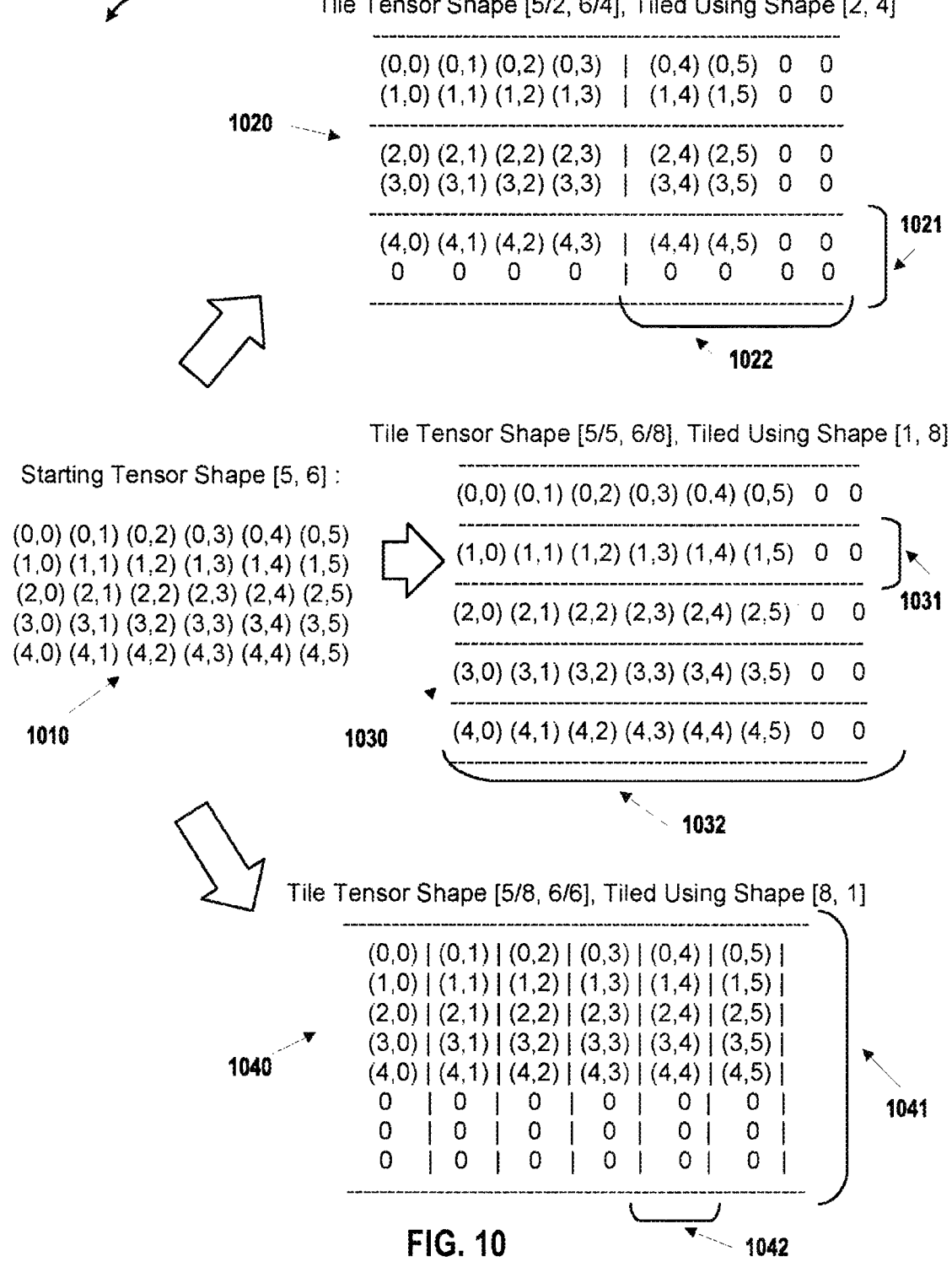
FIG. 10 shows one example of tensor tiling in graph spatial split for gradient calculation methods.

FIG. 10 shows one example of tensor tiling 1000 in accordance with the graph spatial node splitting methods for calculating a gradient via a CGR dataflow computing system disclosed herein. The tiling process may accept a larger starting tensor slice 1010, which may have been sliced on the batch dimension (B). Tiling may break the larger starting tensor slice 1010 into smaller equal-sized blocks, termed tiles. As depicted, diagram 1000 comprises a starting tensor slice 1010 that may be packed and tiled into a first possible tile tensor 1020, second possible tile tensor 1030, or third possible tile tensor 1040. Tiling may provide advantages such as reduced on-chip PMU usage, improved performance, and better resource utilization.

Starting tensor slice 1010 having a starting tensor shape [5, 6] (corresponding to M rows and N columns), may be packed into tile tensor shape [5/m, 6/n] (corresponding to m rows and n columns of each equal-sized tile [m, n]) and tiled using shape [m, n]. Any slot within the first 1020, second 1030, and/or third possible tile tensor 1040 that may be empty because it is not directly mapped to starting tensor slice 1010, may be set to a value of 0.

As depicted, starting tensor slice 1010 may be packed into the first possible tile tensor 1020 having shape [5/2, 6/4]. Each tile within the first possible tile tensor 1020 may have a tile shape of [2, 4], corresponding to m tile rows 1021 (2 rows) and n tile columns 1022 (4 columns). Each element of the starting tensor slice 1010 may be directly mapped to a position within the first possible tile tensor 1020. If any slots within the first possible tile tensor 1020 are empty, then those slots may be filled with a value of 0. A PCU may have access to sets of rows and/or columns (or individual tile slots/elements) to access each tile within the first possible tile tensor 1020.

As depicted, starting tensor slice 1010 may be packed into the second possible tile tensor 1030 having shape [5/5, 6/8].

Each tile within the second possible tile tensor 1030 may have tile shape [1, 8], corresponding to m tile rows 1031 and n tile columns 1032 (i.e. [m,n]). Each element of the starting tensor slice 1010 may be directly mapped to a position within the second possible tile tensor 1030.

As depicted, starting tensor slice 1010 may be packed into the third possible tile tensor 1040 having shape [5/8, 6/6]. Each tile within the third possible tile tensor 1040 may have tile shape [8, 1], corresponding to m tile rows 1041 and n tile columns 1042 (i.e. [m, n]). Each element of the starting tensor slice 1010 may be directly mapped to a position in the third possible tile tensor 1040.

A tensor may generally be defined by the following sets of relationships. A tensor slice, $T[n_1, n_2, \ldots, n_k]$, may be divided into smaller equal-sized tiles (each element may be a tile: $n_1, n_2, \ldots, n_k$), each tile having the shape $[t_1, t_2, \ldots, t_k]$.

Mapping of a starting tensor slice may be defined by the following sets of relationships. Given tensor slice, $C[c_1, c_2, \ldots, c_k]$, such that each element of C is a tile. Then, for the following, $i=1 \ldots k$, tile elements may be defined by $c_i=ceiling(n_i/t_i)$. In addition, a specific tile D in C may be described as $D=C(a_1, a_2, \ldots, a_k)$, for $0 \leq a_i < c_i$. A specific slot inside tile D may be defined as $D(b_1, b_2, \ldots, b_k)$, for $0 \leq b_i < t_i$. An element of the starting tensor slice, $T(e_1, e_2, \ldots, e_k)$ may be mapped to tile indices $a_i=floor(e_i/t_i)$ and indices inside this tile $b_i=e_i \bmod t_i$. All other slots in C that are not mapped to any element of T may be set to 0.

A starting tensor slice 1010 may map to a PMU, or preferably to DRAM for the methods described herein. Starting tensor 1010, corresponding to one or more on-chip PMUs, may be partitioned into tiles, forming the first 1020, second 1030, and third possible tile tensor 1040, within the PMU and on-chip. However, storage of the starting tensor slice 1010 on-chip, may consume a large number of PMU resources and may add to place and route issues. Alternatively, a starting tensor slice 1010 may be stored in DRAM and tiling may occur in DRAM so that a specific tile may be brought down to the chip for gradient calculations.

For example, it may be possible to store a tensor slice [1×M×K] in PMUs while storing another tensor slice [1×K×N] in DRAM. In addition, one tensor slice stored on-chip may be reshaped so that a tensor slice of shape [M×K] may be stored in PMUs while tensor slice of shape [N×K] may be stored in DRAM. The DRAM-derived tensor slice may be tiled in DRAM along the "N-dimension" so that only tiles are brought down to the chip for processing via GeMIVI node(s). Vertical and or horizontal cuts may be made to generate tiles. For example, a reshaped tensor slice [K×N] may be split along the N-dimension to produce N/32 tiles of shape [K×32] that may be processed via GeMM operations.

Tensor tiling may include temporal tiling or spatial tiling. Temporal tiling may use loop meta-pipelines to tile a large tensor or tensor slice (for example, in a tensor based gradient operation), whereas spatial tiling may split a large tensor or tensor slice into vertical and/or horizontal tiles (or sub-tensors). For example, temporal tiling on Tensor <5×64× 32×16> having batch dimension of 5, may include 5 iterations of a loop meta-pipeline with the $Tensor_{tile}$<64×32× 16>. In contrast, spatial tiling may include splitting a node into more than one node. For example, spatial tiling of Tensor <5×64×32×16> having batch dimension of 5, may include processing $Tensor_0$ <5×32×32×16> on the first node and processing $Tensor_1$ <5×32×32×16> on the second node to produce two separate results. $Tensor_0$ and $Tensor_1$ may be processed in parallel on 2 parallel nodes. Then, the two separate results may be concatenated. In the present invention, spatial tiling of tensors across B nodes, instead of temporal tiling across a node specifying a template-based operation, may facilitate gradient calculation without the use of accumulators; and further, it may alleviate place and route issues, improve chip utilization, free up PMUs, as well as improve runtime performance.

Figure 11:
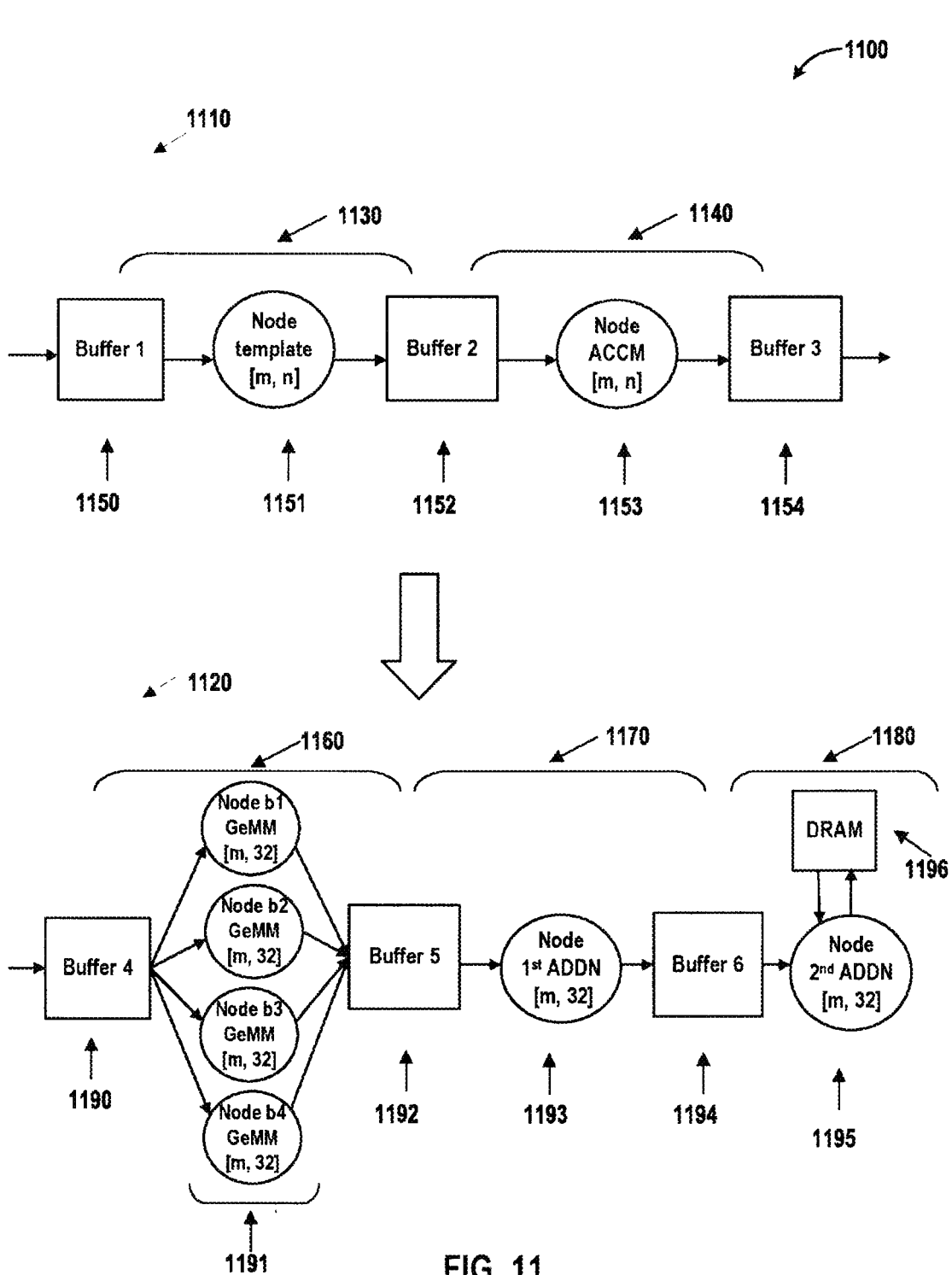
FIG. 11 is a graph diagram of one example of splitting an operation node in a graph spatial split for gradient calculation.

FIG. 11 is a set of before and after compute graphs 1100 of one example of graph optimization for a CGR dataflow computing system. As depicted, compute graphs 1100 comprise a before-compute graph 1110 that is optimized to produce a first modified compute graph 1120. One having skill in the art will appreciate that the following described optimizations could be adapted for code statements rather than a compute graph.

A first meta-pipeline stage 1130 within a before-compute graph 1110 may comprise a first template-based operation node 1151 that specifies a (gradient) operation on a first tensor (for example, a first tensor with dimensions [B, M, K]) and a second tensor (for example, a second tensor with dimensions [B, K, N]). The first template-based operation node 1151 may use temporal tiling to process the first and second tensors. The first tensor and second tensor may be stored in DRAM. The first and second tensors may be sliced along the batch dimension, B, so that the first and second tensor slices may be held in a (logical) buffer corresponding to one or more PMUs. First meta-pipeline stage 1130 may comprise a first stage boundary buffer 1150, which may store the first and second tensor slices, and a second stage boundary buffer 1152, which may hold the resulting (matrix multiplication) tensor slice. The first stage boundary buffer 1150 and second stage boundary buffer 1152 may provide tensor slices to and receive tensor slices from, respectively, operation node 1151. Each operation may correspond to one or more PCUs.

A second meta-pipeline stage 1140 may comprise a second template-based operation node 1153 that specifies an accumulator function. The second addition (ADDN) node 1153 may compute intermediate sums via temporal tiling. Second meta-pipeline stage 1140 may comprise a second stage boundary buffer 1152, which may hold the resulting (matrix multiplication) tensor slice, and a third stage boundary buffer 1154, which may hold the tensor slice corresponding to the intermediate sums and/or calculated batch gradient. The second stage boundary buffer 1152 and third stage boundary buffer 1154 may provide tensor slices to and receive tensor slices from, respectively, the second ADDN node 1153.

Before-compute graph 1110 may require a large memory footprint to store all of the following on chip: the first and second tensor slices, the resulting (matrix multiplication) tensor slice, and the tensor slice corresponding to the intermediate sums and/or calculated batch gradient. This large memory footprint significantly limits the number of PCUs that may be used for each operation, creates congestion/inflexibility on the chip, and limits overall compute utilization.

During compute graph optimization 1100 the after compute graph 1120 may be generated. Operation node 1151 may be split into B operation nodes 1191. The third meta-pipeline stage 1160 corresponding to the spatially split graph may include B (parallel) GeMM operation nodes 1191 (spatially tiled). Each of the B operation nodes 1191 specifies the GeMM operation on a first reduced rank tensor slice (i.e., a modified first tensor slice stored on-chip) and a tile (may be obtained from the second tensor slice stored in DRAM). A fourth stage buffer 1190 may provide the reduced rank tensor slice and tile to each of the B operation nodes 1191 to calculate each of the B resulting (GeMM) tiles, which may then be held in a fifth stage buffer 1192.

In the fourth meta-pipeline stage 1170, B resulting (GeMM) tiles may be provided to a first addition (ADDN) node 1193 to calculate a resulting sum tile that may be placed in a sixth stage buffer 1194. In a fifth meta-pipeline stage 1180, the resulting sum held in the sixth stage buffer 1194 and a previous intermediate sum, which may be stored in DRAM 1196, may be summed together in the second ADDN node 1195 to produce a new intermediate sum (or final gradient if no additional tiles remain) for storage in DRAM. As depicted, the components of the third 1160, fourth 1170, and fifth meta-pipeline 1180 may comprise a first modified compute graph.

The B operation nodes may optionally be processed in multiple smaller groups of nodes, called sections. For example, if the batch size is 4, then one section may comprise only 2 GeMM operation nodes. By extension only 2 resulting (GeMM) tiles would be fed to the at least one first ADDN node 1193 for summation to produce the resulting summed tile (these may further be combined with previous intermediate sums). Sections provide an added layer of flexibility that may be particularly useful with the reconfigurable dataflow computing system. For example, a first tensor slice may be stored on-chip in fourth stage buffer 1190 and may be particularly large. If too many PMUs are required, then a section may include fewer operation nodes of the B parallel operation nodes 1191 to minimize on-chip congestion issues. Sections may allow further resource optimization.

In after-graph 1120, the first tensor slice may be stored on-chip and may require sizeable PMU usage (memory footprint for storage). In contrast, the second input into the B GeMM nodes 1191 may be a tile, derived from the second tensor slice that is stored and tiled in DRAM. This may save PMU usage. Further PMU savings may occur because the B resulting (GeMM) tiles held in fifth stage buffer 1192 may require fewer PMUs than the resulting (matrix multiplication) tensor slice held in second stage buffer 1152. Additional PMU saving may occur in the fifth meta-pipeline stage 1180 because the B resulting sums held in sixth buffer 1194 (and the B intermediate sums held in DRAM 1196) require fewer PMUs than the intermediate sums and/or calculated batch gradient held in third stage buffer 1154. The modified compute graph shown in after graph diagram 1120 may provide additional savings in PMU usage, PCU usage, and improve overall compute utilization.

In another example (not depicted), the first and second tensor slices with dimensions of [6144, 2048] and [2048, 6144] and batch size 4 may be processed according to before compute graph 1110. A resulting (matrix multiplication) tensor slice of [6144×2048×6144] may be calculated by a template-based (gradient) operation node that requires temporal tiling to process the first batch dimension. The resulting (matrix multiplication) tensor slice may be fed to the second template-based operation node, an accumulator, to calculate the gradient for each of the B batch dimensions. Processing all of the batches requires iterating each template-based operation 4 times (according to batch size of 4). In this approach, storing the gradient tensor slice may use 192 PMUs. Additional PMUs may be required to store several more input and intermediate tensor slices.

In contrast, the first and second tensor slices with dimensions of [6144, 2048] and [2048, 6144] and batch size 4 may be processed according to after compute graph 1120. The one template-based operation node may be spatially split into 4 GeMM operation nodes. Temporal tiling may be replaced by spatial tiling, in which tiling may be performed along the N-dimension (along the 6144 dimension of [2048, 6144] to create a total of 6144/32 [2048, 32] indexed tiles or 192 [2048,32] indexed tiles) to generate an input tile of dimension [6144, 32] from each of the 4 batches to provide as input to each of the 4 parallel GeMM nodes. Each of the 4 resulting (GeMM) tiles may be stored in a buffer and added together (via first ADDN node) to produce one resulting summed tile, which may be concatenated (via a second ADDN node) with previous intermediate sums that may be stored in DRAM. The first modified compute graph may allow for a large PMU savings.

Figure 12:
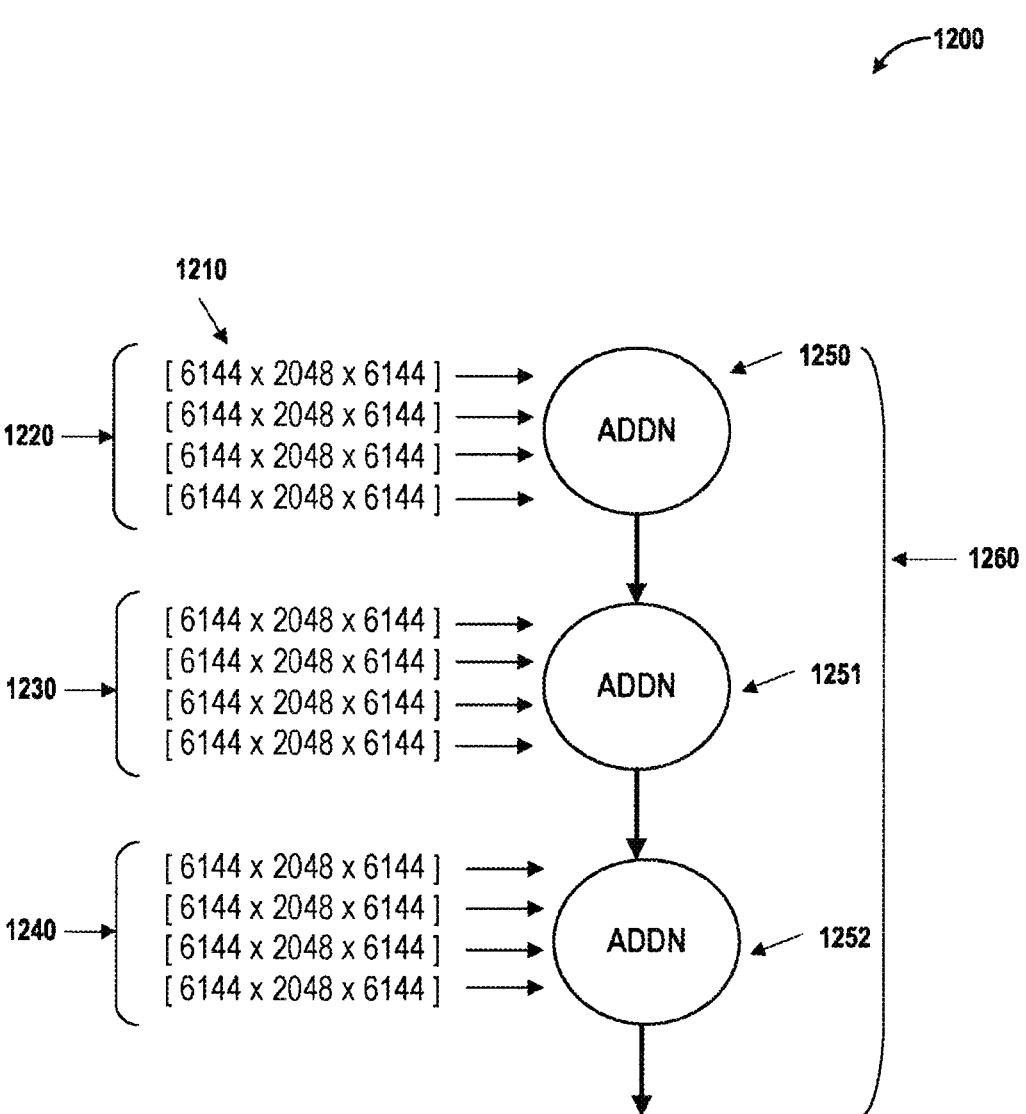
FIG. 12 is a graph diagram of one example of spatial tiling with addition nodes in a graph spatial split for gradient calculation.

FIG. 12 shows a diagram 1200 of one example of adding tiles to compute the gradient according to a first modified compute graph for processing in a CGR dataflow computing system. As depicted, an individual resulting (GeMM) tile 1210 is one of 4 resulting (GeMM) tiles in the first section 1220 (derived from corresponding to 4 GeMM nodes). Each of the 4 resulting (GeMM) tiles of the first section 1220 feed a resulting (GeMNI) tile to a first addition ADDN node 1250 to generate one resulting summed tile from first ADDN node 1250. The one resulting summed tile from first ADDN node 1250 may be combined with a corresponding previous intermediate sum (loaded from DRAM) for the first section 1220 to generate a new intermediate sum for the first section 1220. Each first ADDN node (1250, 1251, 1252) is a template that accepts any number of inputs and adds them using a tree structure. GeMM nodes may be divided into sections, with section size defined as needed to achieve desired parallelization.

Similarly, a second section 1230 (corresponding to 4 GeMM nodes) provides 4 resulting (GeMM) tiles to a first addition ADDN node 1251 to generate one resulting summed tile from first ADDN node 1251. The one resulting summed tile from another first ADDN node 1251 may be combined with a corresponding previous intermediate sum (loaded from DRAM) for the second section 1230 to generate a new intermediate sum for the second section 1230.

Next, a third section 1240 (corresponding to 4 GeMM nodes) provides 4 resulting (GeMM) tiles to a first ADDN node 1252 to generate one resulting summed tile from the first ADDN node 1252. The one resulting summed tile from first ADDN node 1252 may be combined with a corresponding previous intermediate sum (loaded from DRAM) for the third section 1240 to generate a new intermediate sum for the third section 1240. Finally, the one resulting summed tile from the first ADDN node 1250 and new intermediate sum for the first section 1220, one resulting summed tile from the first ADDN node 1251 and new intermediate sum for the second section 1230, and one resulting summed tile from the first ADDN node 1252 and new intermediate sum for the third section 1240 may summed together 1260 to provide a gradient value calculated for the depicted nodes and sections.

Figure 13:
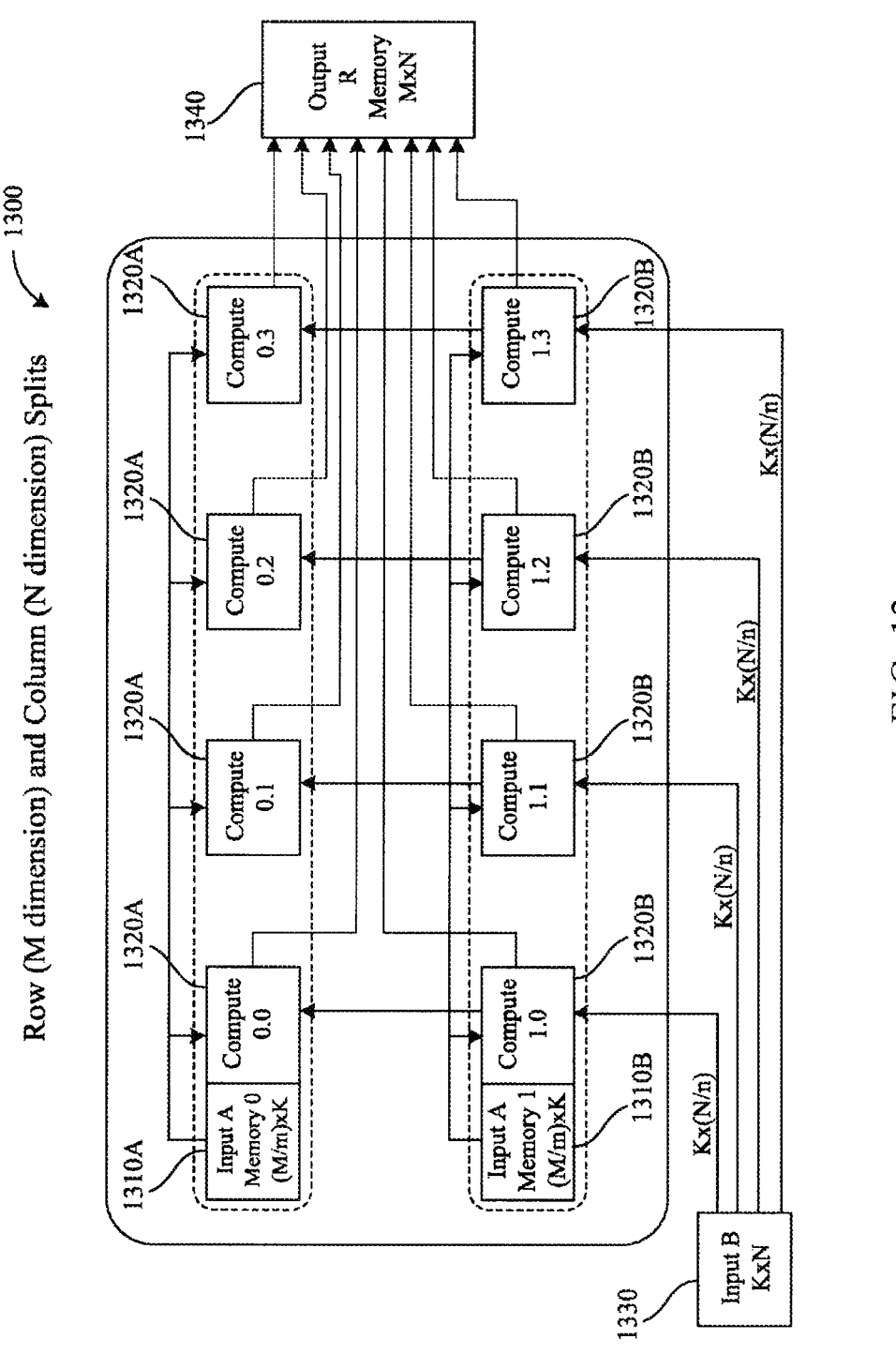
FIG. 13 shows one example of distributing tensors in an example grid computing environment.

FIG. 13 shows one example of distributing tensors in an example grid computing environment. As depicted, tensor (slice) A data may be distributed to memory units 1310 that are each (tightly) coupled to, and dedicated to, a row of compute units 1320. Tensor (slice) B may be stored in a single memory unit 1330 and tensor (slice) R may be stored in a single (grid connected) memory unit 1340. The compute grid may have m rows and n columns (m×n). Tensor A and tensor R may comprise M rows, whereas tensor B and tensor R may comprise N columns.

In the depicted example, memory unit 1310A is coupled to (a first row of) compute units 1320A, memory unit 1310B is coupled to (a second row of) compute units 1320B and M/m (i.e., half of the) rows of tensor A are provided to each row of compute units 1320 in K sequentially streamed vector packets comprising tensor A. For example, the methods of the present invention may be implemented by increasing the number of operation nodes (or compute units) to B parallel nodes.

In contrast, tensor B data may be narrowcast, as needed, to a specific set of compute units. For example, all of the compute units in a column of a (virtual or physical) computing grid may be provided with specific (e.g., N/n) columns from tensor B that correspond to their assigned sub-tensor. The specific columns may be sent (i.e., narrowcast) from one or more memory units 1330 via a set of K packets that are intended only for those compute units. Consequently, in the described embodiment, each of the compute units in the grid need only be provided with and receive those packets that contain those columns of tensor B that correspond to their assigned sub-tensor. Narrowcasting may be implemented by the methods of the present invention, for example, to provide smaller tensor blocks or tiles that may be split along the column direction for processing by B (batch dimension) parallel GeMM nodes (which can correspond to an increased number of compute units).

In the depicted embodiment, tensor B may be stored in a single memory unit 1330 and tensor R may be stored in a single (grid connected) memory unit 1340. However, tensor B and/or tensor R, may be spread across multiple memory units 1330/1340. In those embodiments, an interposer memory unit (not shown) may be used to retrieve tensor B data and distribute the data to the appropriate compute units as needed. Similarly, an interposer memory unit (not shown) may be used to receive tensor R data from the compute units and distribute the data to the appropriate memory units that are selected to (at least temporarily) store tensor R.

As shown in FIG. 13, tensor A data may be preferably partitioned by rows into separate memory units for each row of compute units. In contrast, tensor B data may be broadcast to all compute units or narrowcast to each column of compute units by a similar partitioning of the tensor B data by columns.

Figure 14:
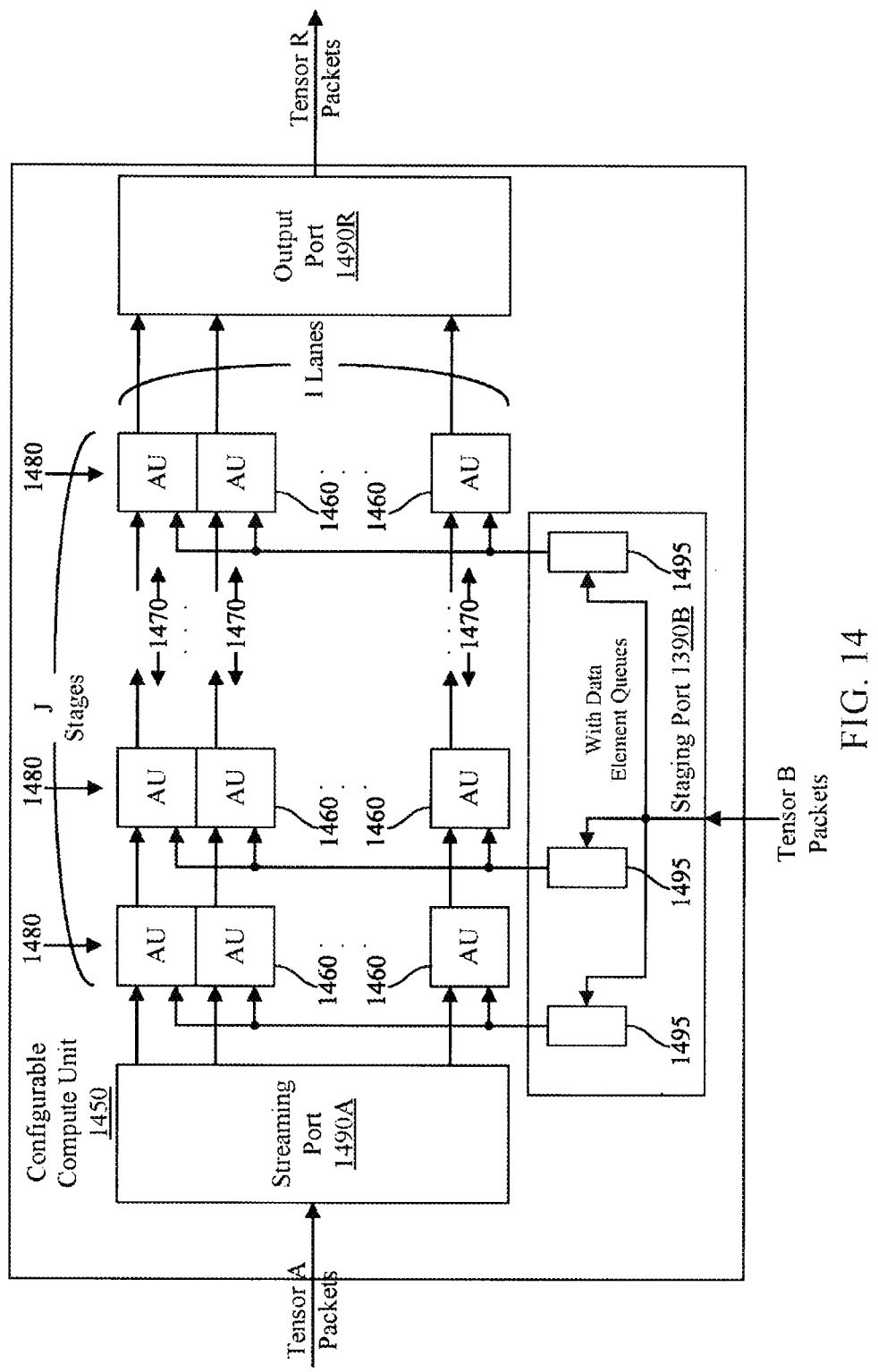
FIG. 14 is a block diagram illustrating one example of a compute unit configurable for the graph spatial split for gradient calculation methods disclosed herein.

FIG. 14 is a block diagram illustrating one example of a compute unit 1450 configurable for tensor operations. As depicted, the compute unit 1450 includes an array of arithmetic units 1460 organized into I lanes 1470 and J (pipelined) stages 1480. The compute unit 1450 also includes a set of ports 1490 including a streaming port 1490A that receives packets of tensor (slice) A data, a staging port 1490B that receives packets of tensor (tile) B data, and an output port 1490R that provides packets of tensor R data. A packet of tensor A data and a packet of tensor R data may correspond to a tensor block with M rows, whereas a packet of tensor B data and a packet of tensor R data may correspond to a tensor block with N columns.

The streaming port 1490A may be configured to sequentially stream K vector packets comprising tensor A data through the I lanes of the array of arithmetic units 1460. Each of the K vector packets may comprise I column-ordered data elements corresponding to I rows of tensor A data. Alternatively, each of the K vector packets may comprise I column-ordered data elements corresponding to I columns of tensor A data. In one embodiment, a row connected memory unit is configured to stream the I rows of tensor A data by providing the K vector packets to the compute unit 1450 and other compute units 1450 on the same row of a computing grid that are assigned to perform the tensor operation.

The staging port 1490B may be configured to receive J vector packets corresponding to J columns of tensor B data and sequentially provide a data element from each of the J vector packets to a corresponding stage of the array of arithmetic units 1460. The J vector packets may be received by a set of J data element queues 1495 that sequentially provide one data element at a time to the arithmetic units 1460 of the corresponding stage 1470.

The arithmetic units 1460 may be configured to repetitively conduct operations by using a data element from the streaming port (i.e., a row of tensor A) and a data element from the staging port (i.e., a column of tensor B). One of skill in the art will appreciate that the stages 1480 of the array of arithmetic units 1460 may act as data registers for the lanes 1480 while the tensor A data is streamed through the stages of the compute unit and the operations are conducted. When the K operations are complete, the computed values may be streamed to one or more assigned memory units via the output port 1490R. The process may be repeated until all rows (e.g., M/m) and columns (e.g., N/n) of the assigned sub-tensor have been computed by the compute unit 1450.

The examples disclosed herein include a system for improving runtime performance and alleviating place and route issues in a reconfigurable dataflow processors, the system comprising:

a host computer comprising a graph optimization module configured to conduct a method comprising:

receiving a compute graph for execution on a reconfigurable dataflow processor (RDP), the compute graph comprising a node specifying a template-based (gradient) operation on a first tensor and a second tensor, the first and second tensors having a shared batch dimension of length B splitting the node into B nodes that each specify the template-based operation the first and second tensors replacing each of the template-based operations on the pair of tensors with a general matrix multiplication (GeMM) operation on the first reduced rank tensor slice and a tile to produce B nodes that specify the GeMM operation appending the B nodes that specify the GeMM operation with at least one first addition (ADDN) node that accepts input from the B nodes that specify the GeMM operation to produce a first modified compute graph; and a reconfigurable dataflow processor (RDP) configured to execute the first modified compute graph Optional features for the above system include:

slicing the first and second tensors on the shared batch dimension of length B to produce B first tensor slices and B second tensor slices, each of the first and second tensors of the B first tensor slices and B second tensor slices having a batch dimension of length 1 reshaping each of the first and second tensors of the B first tensor slices and B second tensor slices to produce B reduced rank first tensor slices and B reduced rank second tensor slices, a reduced rank first tensor slice of the B reduced rank first tensor slices corresponding to the reduced rank first tensor slice in the GeMM operations tiling each reduced rank second tensor slice of the B reduced rank second tensor slices to produce B tile sets, each tile set of the B tile sets having indexed tile elements wherein each tile of the B tile sets has an equal block size wherein the GeMM operation is performed on a tile of the tile set of the B a pair of tiles having index-paired tile elements wherein one or more of the B nodes that specify the GeMM operation on the first reduced rank tensor and the tile comprise a section wherein each output sub-tensor from each node of the B nodes of a first section are locally summed (by at least one first ADDN node) to generate a first partial sum, each output sub-tensor from each node of the B nodes of a second section are locally summed (by at least one first ADDN node) to generate a second partial sum, and the first partial sum and the second partial sum are locally summed by a second addition (ADDN) node to generate a first intermediate sum wherein the first partial sum is read directly from Dynamic Random-Access Memory (DRAM) and the second partial sum is read from a pattern memory unit (PMU)

wherein the reconfigurable dataflow processor (RDP) comprises a grid of compute units and a grid of memory units interconnected with a switching array, each compute unit comprising an array of arithmetic units organized into I lanes and J meta-pipeline stages wherein the tensor comprises M rows providing each of the M rows to a different lane of the I lanes wherein the M rows are provided by or received by at least one memory unit wherein the tensor flows through at least one compute unit of the grid of compute units wherein the tensor flow is controlled by the at least one memory unit wherein the tensor comprises N columns sequentially providing each of the N columns to a stage of the J stages wherein the N columns are provided by or received by at least one memory unit wherein the tensor flows through at least one compute unit of the grid of compute units wherein the tensor flow is controlled by the at least one memory unit The embodiments disclosed herein include a method for improving runtime performance and alleviating place and route issues in reconfigurable computing system, the method comprising:

receiving a compute graph for execution on a reconfigurable dataflow processor (RDP), the compute graph comprising a node specifying a template-based (gradient) operation on a first tensor and a second tensor, the first and second tensors having a shared batch dimension of length B splitting the node into B nodes that each specify the template-based operation the first and second tensors replacing each of the template-based operations on the pair of tensors with a general matrix multiplication (GeMM) operation on the first reduced rank tensor slice and a tile to produce B nodes that specify the GeMM operation appending the B nodes that specify the GeMM operation with at least one first addition (ADDN) node that accepts input from the B nodes that specify the GeMM operation to produce a first modified compute graph; and executing the first modified compute graph on the RDP Optional features for the above method include:

slicing the first and second tensors on the shared batch dimension of length B to produce B first tensor slices and B second tensor slices, each of the first and second tensors of the B first tensor slices and B second tensor slices having a batch dimension of length 1 reshaping each of the first and second tensors of the B first tensor slices and B second tensor slices to produce B reduced rank first tensor slices and B reduced rank second tensor slices, a reduced rank first tensor slice of the B reduced rank first tensor slices corresponding to the reduced rank first tensor slice in the GeMM operations tiling each reduced rank second tensor slice of the B reduced rank second tensor slices to produce B tile sets, each tile set of the B tile sets having indexed tile elements wherein each tile of the B tile sets has an equal block size wherein the GeMM operation is performed on a tile of the tile set of the B a pair of tiles having index-paired tile elements wherein one or more of the B nodes that specify the GeMM operation on the first reduced rank tensor and the tile comprise a section wherein each output sub-tensor from each node of the B nodes of a first section are locally summed (by at least one first ADDN node) to generate a first partial sum, each output sub-tensor from each node of the B nodes of a second section are locally summed (by at least one first ADDN node) to generate a second partial sum, and the first partial sum and the second partial sum are locally summed by a second addition (ADDN) node to generate a first intermediate sum wherein the first partial sum is read directly from Dynamic Random-Access Memory (DRAM) and the second partial sum is read from a pattern memory unit (PMU)

wherein the reconfigurable dataflow processor (RDP) comprises a grid of compute units and a grid of memory units interconnected with a switching array, each compute unit comprising an array of arithmetic units organized into I lanes and J meta-pipeline stages wherein the tensor comprises M rows providing each of the M rows to a different lane of the I lanes wherein the M rows are provided by or received by at least one memory unit wherein the tensor flows through at least one compute unit of the grid of compute units wherein the tensor flow is controlled by the at least one memory unit wherein the tensor comprises N columns sequentially providing each of the N columns to a stage of the J stages wherein the N columns are provided by or received by at least one memory unit wherein the tensor flows through at least one compute unit of the grid of compute units wherein the tensor flow is controlled by the at least one memory unit As will be appreciated by those of ordinary skill in the art, aspects of the various embodiments described herein may be embodied as a system, device, method, process, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "circuit," "circuitry," "module," "computer," "logic," "FPGA," "unit," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage mediums may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method or process. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e., embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

What is claimed is:

1. A system for reducing latency and increasing throughput in reconfigurable dataflow processors, the system comprising:
- a host computer comprising a graph optimization module configured to conduct a method comprising:
    - receiving a compute graph for execution on a reconfigurable dataflow processor (RDP), the compute graph comprising a node specifying a template-based gradient operation on a first tensor and a second tensor, the first and second tensors having a shared batch dimension of length B;
    - splitting the node into B nodes that each specify the template-based operation the first and second tensors;
    - replacing each of the template-based operations on a pair of tensors with a general matrix multiplication (GeMM) operation on a first reduced rank tensor slice and a tile to produce B nodes that specify the GeMM operation;
    - appending the B nodes that specify the GeMM operation with at least one first addition (ADDN) node that accepts input from the B nodes that specify the GeMM operation to produce a first modified compute graph; and
- a reconfigurable dataflow processor (RDP) configured to execute the first modified compute graph.

2. The system of claim 1, further comprising slicing the first and second tensors on the shared batch dimension of length B to produce B first tensor slices and B second tensor slices, each of the first and second tensors of the B first tensor slices and B second tensor slices having a batch dimension of length 1.

3. The system of claim 2, further comprising reshaping each of the first and second tensors of the B first tensor slices and B second tensor slices to produce B reduced rank first tensor slices and B reduced rank second tensor slices, a reduced rank first tensor slice of the B reduced rank first tensor slices corresponding to the reduced rank first tensor slice in the GeMM operations.

4. The system of claim 3, further comprising tiling each reduced rank second tensor slice of the B reduced rank second tensor slices to produce B tile sets, each tile set of the B tile sets having indexed tile elements.

5. The system of claim 4, wherein each tile of the B tile sets has an equal block size.

6. The system of claim 4, wherein the GeMM operation is performed on a pair of tiles in the B tile sets, wherein the pair of tiles have index-paired tile elements.

7. The system of claim 1, wherein one or more of the B nodes that specify the GeMM operation on the first reduced rank tensor and the tile comprise a section.

8. The system of claim 7, wherein each output sub-tensor from each node of the B nodes of a first section are locally summed by at least one first ADDN node to generate a first partial sum, each output sub-tensor from each node of the B nodes of a second section are locally summed (by at least one ADDN node) to generate a second partial sum, and the first partial sum and the second partial sum are locally summed by a second addition (ADDN) node to generate a first intermediate sum.

9. The system of claim 8, wherein the first partial sum is read directly from Dynamic Random-Access Memory (DRAM) and the second partial sum is read from a pattern memory unit (PMU).

10. A method for reducing latency and increasing throughput in a reconfigurable computing system, the method comprising:
- receiving a compute graph for execution on a reconfigurable dataflow processor (RDP), the compute graph comprising a node specifying a template-based gradient operation on a first tensor and a second tensor, the first and second tensors having a shared batch dimension of length B;
- splitting the node into B nodes that each specify the template-based operation the first and second tensors;
- replacing each of the template-based operations on a pair of tensors with a general matrix multiplication (GeMM) operation on a first reduced rank tensor slice and a tile to produce B nodes that specify the GeMM operation;
- appending the B nodes that specify the GeMM operation with at least one first addition (ADDN) node that accepts input from the B nodes that specify the GeMM operation to produce a first modified compute graph; and
- executing the first modified compute graph on the RDP.

11. The method of claim 10, further comprising slicing the first and second tensors on the shared batch dimension of length B to produce B first tensor slices and B second tensor slices, each of the first and second tensors of the B first tensor slices and B second tensor slices having a batch dimension of length 1.

12. The method of claim 11, further comprising reshaping each of the first and second tensors of the B first tensor slices and B second tensor slices to produce B reduced rank first tensor slices and B reduced rank second tensor slices, a reduced rank first tensor slice of the B reduced rank first tensor slices corresponding to the reduced rank first tensor slice in the GeMM operations.

13. The method of claim 12, further comprising tiling each reduced rank second tensor slice of the B reduced rank second tensor slices to produce B tile sets, each tile set of the B tile sets having indexed tile elements.

14. The method of claim 13, wherein each tile of the B tile sets has an equal block size.

15. The method of claim 13, wherein the GeMM operation is performed on a pair of tiles in the B tile sets, wherein the pair of tiles have index-paired tile elements.

16. The method of claim 10, wherein one or more of the B nodes that specify the GeMM operation on the first reduced rank tensor and the tile comprise a section.

17. The method of claim 16, wherein each output sub-tensor from each node of the B nodes of a first section are locally summed by at least one first ADDN node to generate a first partial sum, each output sub-tensor from each node of the B nodes of a second section are locally summed by at least one first ADDN node to generate a second partial sum, and the first partial sum and the second partial sum are locally summed by a second addition (ADDN) node to generate a first intermediate sum.

18. The method of claim 17, wherein the first partial sum is read directly from Dynamic Random-Access Memory (DRAM) and the second partial sum is read from a pattern memory unit (PMU).

19. A non-transitory computer program product comprising a non-transitory computer readable storage medium having program instructions embodied therewith, wherein the non-transitory computer readable storage medium is not a transitory signal per se, wherein the program instructions are executable by a processor to cause the processor to conduct a method comprising:

receiving a compute graph for execution on a reconfigurable dataflow processor (RDP), the compute graph comprising a node specifying a template-based gradient operation on a first tensor and a second tensor, the first and second tensors having a shared batch dimension of length B;

splitting the node into B nodes that each specify the template-based operation the first and second tensors;

replacing each of the template-based operations on a pair of tensors with a general matrix multiplication (GeMM) operation on a first reduced rank tensor slice and a tile to produce B nodes that specify the GeMM operation;

appending the B nodes that specify the GeMM operation with at least one first addition (ADDN) node that accepts input from the B nodes that specify the GeMM operation to produce a first modified compute graph; and executing the first modified compute graph on the RDP.

*    *    *    *    *